US012354082B2

(12) United States Patent
Anton et al.

(10) Patent No.: US 12,354,082 B2
(45) Date of Patent: Jul. 8, 2025

(54) SECURE STORAGE AND/OR TRANSFER OF DISTRIBUTED LEDGER TOKEN THROUGH A POSSESSION TOKEN STORING A PRIVATE KEY CONTROLLING THE LEDGER TOKEN

(71) Applicant: THE ONLI CORPORATION, Miami, FL (US)

(72) Inventors: Dhryl Anton, Paradise Valley, AZ (US); Michael McFall, Paradise Valley, AZ (US)

(73) Assignee: THE ONLI CORPORATION

( * ) Notice: Subject to any disclaimer, the term of this patent is extended or adjusted under 35 U.S.C. 154(b) by 0 days.

(21) Appl. No.: 18/747,420

(22) Filed: Jun. 18, 2024

(65) Prior Publication Data

US 2024/0338682 A1 Oct. 10, 2024

Related U.S. Application Data

(63) Continuation of application No. 17/993,973, filed on Nov. 24, 2022, now Pat. No. 12,020,238, which is a
(Continued)

(51) Int. Cl.
*G06Q 20/36* (2012.01)
*G06Q 20/02* (2012.01)
(Continued)

(52) U.S. Cl.
CPC ....... *G06Q 20/3672* (2013.01); *H04L 9/0637* (2013.01); *H04L 9/0643* (2013.01); *H04L 9/0825* (2013.01); *H04L 9/085* (2013.01)

(58) Field of Classification Search
CPC .. G06Q 20/3672; G06Q 20/02; G06Q 20/065; G06Q 20/38215; G06Q 2220/00;
(Continued)

(56) References Cited

U.S. PATENT DOCUMENTS 10,269,009 B1 * 4/2019 Winklevoss ......... G06Q 20/105
2016/0364787 A1 * 12/2016 Walker .................. H04L 9/0891
(Continued)

OTHER PUBLICATIONS

Kolan Moving Target Mechanism using Infinite Hash Chain in Hierarchical Peer-to-Peer Cloud, JNTU University, Jul. 2014, 67 pages (Year: 2014).*

*Primary Examiner* — James D Nigh
(74) *Attorney, Agent, or Firm* — Peter Jensen-Haxel

(57) ABSTRACT

In one embodiment, a method may include generating a first public-private key pair having a public key usable as a public address of the ledger token of a distributed ledger network and a private key usable to transfer the ledger token of the distributed ledger network. The method may verify that a ledger transaction occurred. The method may include generating a possession token storable in physical memory and having a state indicated by a state indicator, where the state of the possession token evolves upon transfer between two computing devices over a network. The method may include cryptographically associating the ledger token and the possession token through incorporation of the public address into data generating the state indicator of the state of the possession token. The method may include encrypting the private key to form an encrypted private key and storing the encrypted private key in the possession token.

20 Claims, 14 Drawing Sheets

Related U.S. Application Data continuation of application No. 16/789,441, filed on Feb. 13, 2020, now Pat. No. 11,544,701, which is a continuation of application No. 16/361,256, filed on Mar. 22, 2019, now Pat. No. 10,600,050.

(51) Int. Cl.
| | | |
|---|---|---|
| *G06Q 20/06* | (2012.01) | |
| *G06Q 20/38* | (2012.01) | |
| *H04L 9/00* | (2022.01) | |
| *H04L 9/06* | (2006.01) | |
| *H04L 9/08* | (2006.01) | |
| *H04L 9/32* | (2006.01) | |

(58) Field of Classification Search
CPC ... H04L 9/0637; H04L 9/0643; H04L 9/0825; H04L 9/085; H04L 9/0838; H04L 9/3255; H04L 9/50; H04L 9/3239
USPC .......................................................... 705/66
See application file for complete search history.

(56) References Cited

U.S. PATENT DOCUMENTS

| | | | |
|---|---|---|---|
| 2017/0178072 A1* | 6/2017 | Poornachandran | ... H04L 9/3236 |
| 2019/0014094 A1* | 1/2019 | Le Saint | ................. H04L 63/06 |
| 2019/0147553 A1* | 5/2019 | Reber | ................. G06Q 20/389 |
| | | | 705/65 |

* cited by examiner

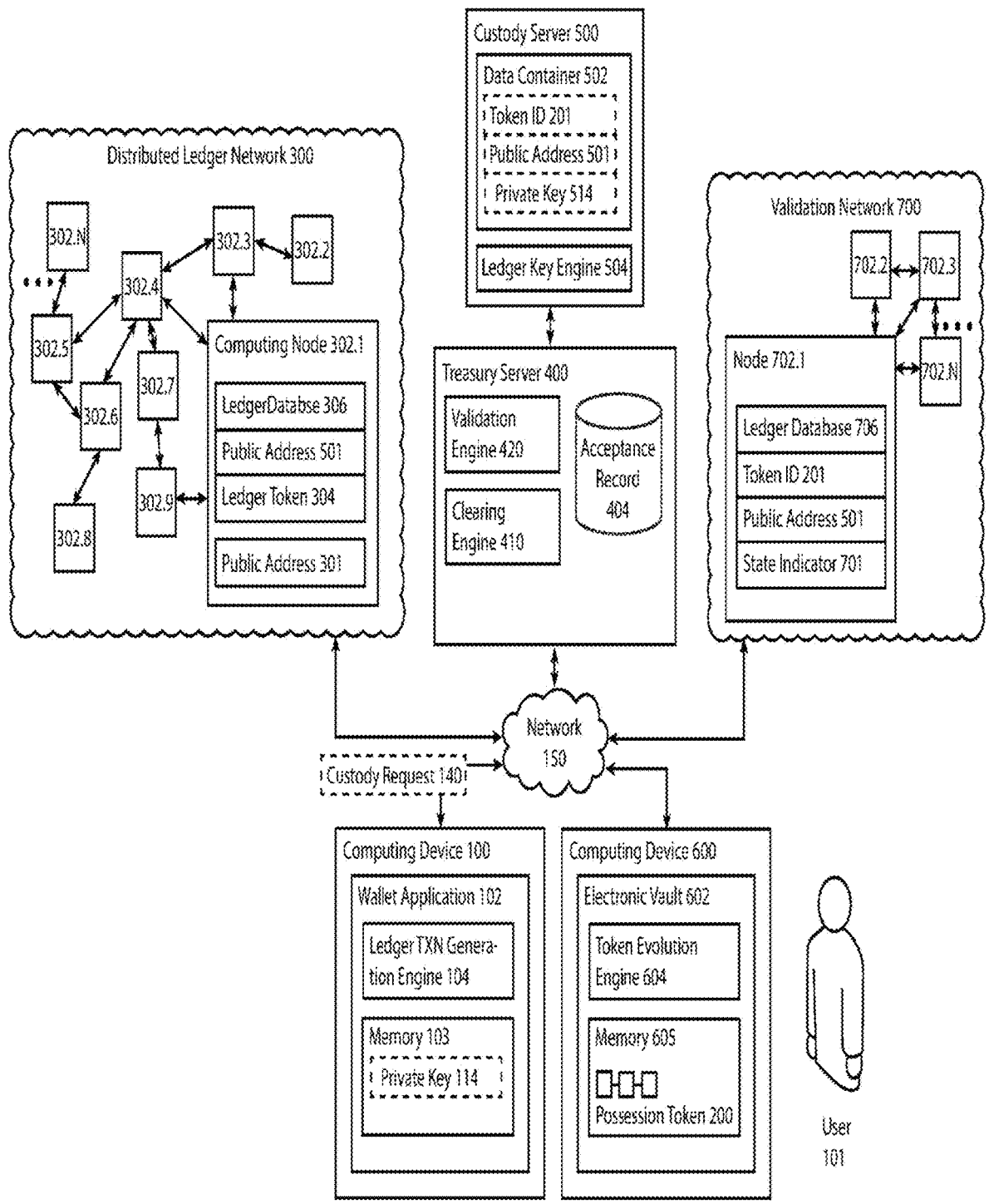
FIG. 1    LEDGER TOKEN POSSESSION NETWORK 190

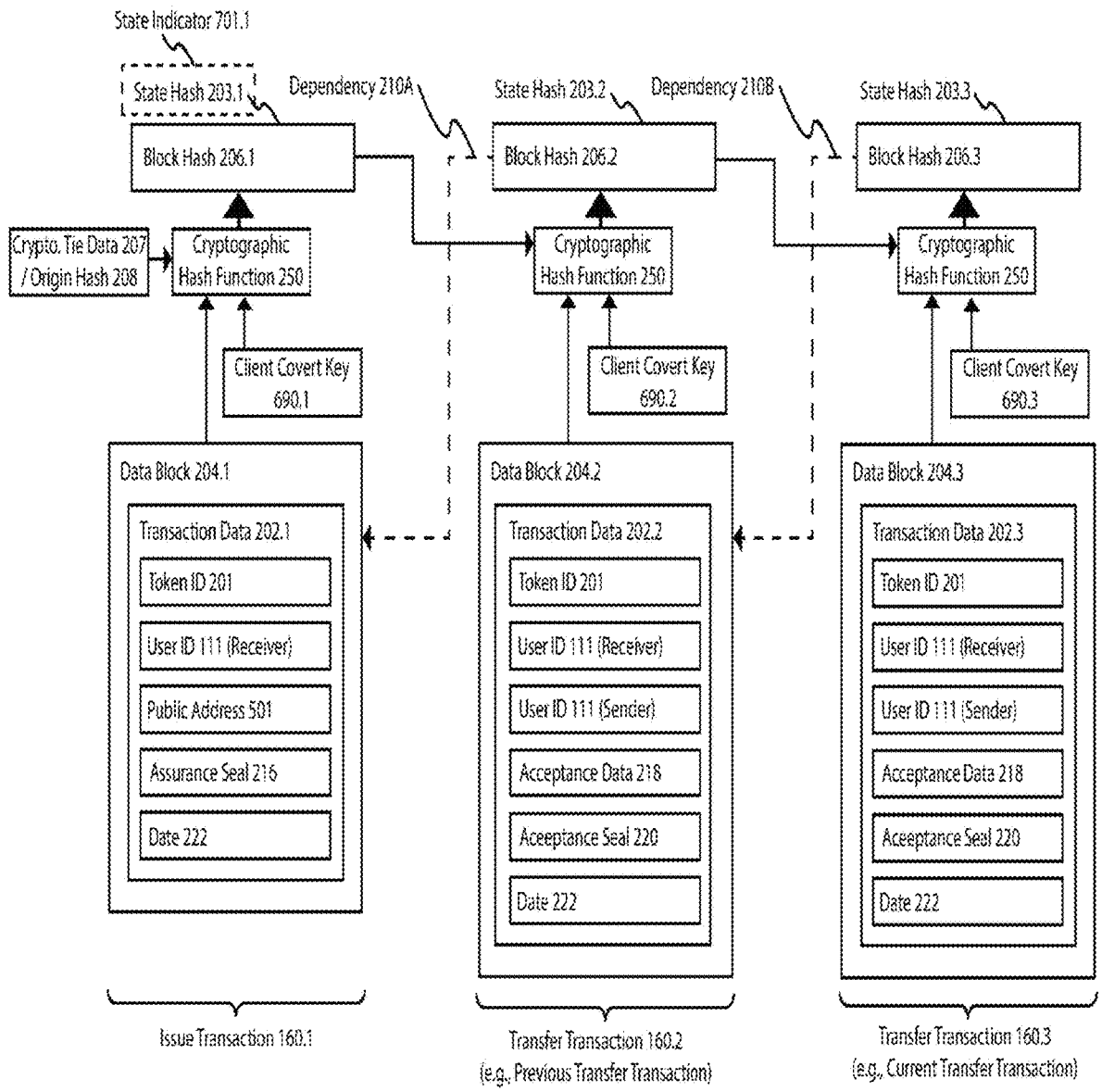
FIG. 2    POSSESSION TOKEN 200

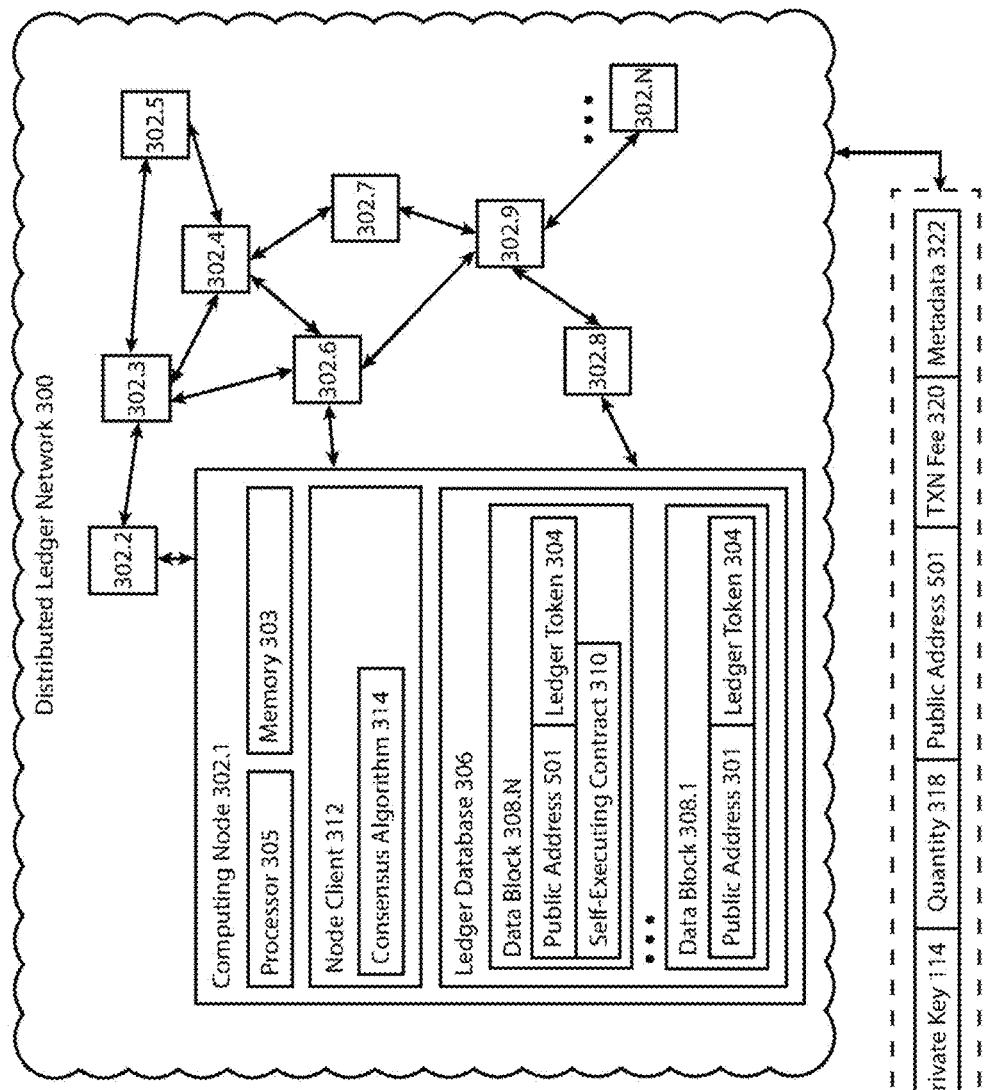
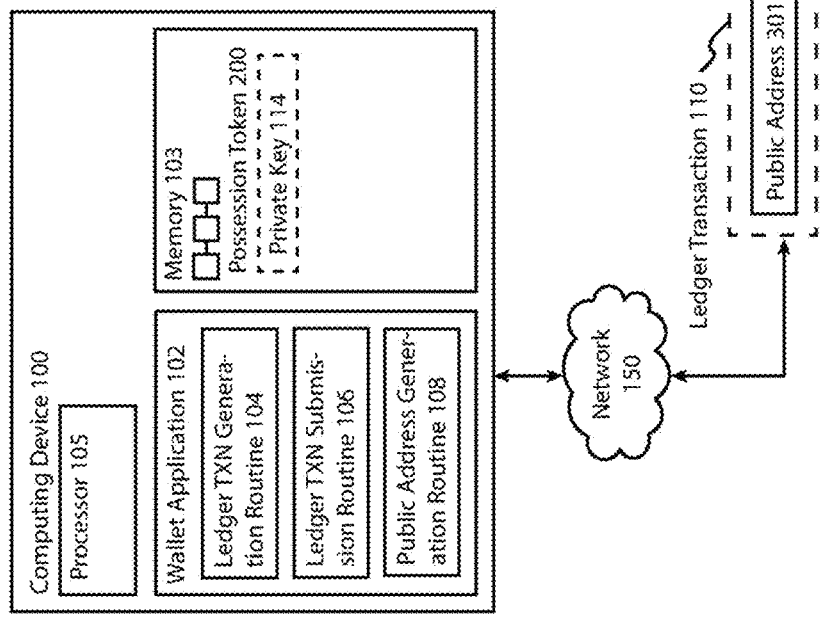
FIG. 3  DISTRIBUTED LEDGER NETWORK 300

VALIDATION SYSTEM
700

FIG. 8  CUSTODY INITIATION PROCESS 850

FIG. 9  CUSTODY VERIFICATION AND BINDING PROCESS FLOW 950

FIG. 10  POSSESSION TOKEN KEY EXCHANGE PROCESS FLOW 1050

FIG. 11  POSSESSION TOKEN VALIDATION PROCESS FLOW 1150

FIG. 12  POSSESSION TOKEN VALIDATION PROCESS FLOW 1250

FIG. 13  ISSUE TRANSACTION PROCESS DIAGRAM 1350

FIG. 14 TRANSFER TRANSACTION PROCESS DIAGRAM 1450

CUSTODY DEPLOYMENT NETWORK 1550

SECURE STORAGE AND/OR TRANSFER OF DISTRIBUTED LEDGER TOKEN THROUGH A POSSESSION TOKEN STORING A PRIVATE KEY CONTROLLING THE LEDGER TOKEN

CROSS-REFERENCE TO RELATED APPLICATIONS

This application claims the benefit of and continuation of U.S. patent application Ser. No. 17/993,973, entitled LEDGER TOKEN TRANSFER OUTSIDE OF A DISTRIBUTED LEDGER NETWORK THROUGH CRYPTOGRAPHIC BINDING TO A TRANSFERRABLE POSSESSION TOKEN, filed Nov. 24, 2022, which is a continuation of U.S. patent application Ser. No. 16/789,441, entitled "RAPID AND SECURE OFF-LEDGER CRYPTOCURRENCY TRANSACTIONS THROUGH CRYPTOGRAPHIC BINDING OF A PRIVATE KEY TO A POSSESSION TOKEN", filed Feb. 13, 2020, which is a continuation of U.S. Utility patent application Ser. No. 16/361,256 filed Mar. 22, 2019, entitled: SECURE CUSTODY OF A LEDGER TOKEN AND/OR A QUANTITY OF CRYPTOCURRENCY OF A DISTRIBUTED LEDGER NETWORK THROUGH BINDING TO A POSSESSION TOKEN. The patent application identified above are incorporated here by reference in its entirety to provide continuity of disclosure.

FIELD OF TECHNOLOGY

This disclosure relates generally to data processing devices and, more particularly, to a method, a device, and a system of secure storage and/or transfer of distributed ledger token through a possession token storing a private key controlling the ledger token.

BACKGROUND

A ledger may store records of transactions, where each transaction may be an entry in the ledger. A ledger may be stored and maintained electronically as a ledger database, where the ledger database is a collection of structured data stored in a memory. While many such methods of storing ledgers exist, a more recent development may have been a distributed ledger network comprising a set of computing devices communicating over a network (e.g., the Internet). One or more of the computing devices of the distributed ledger network store the ledger database (which may be referred to as "computing nodes", or simply "nodes") and synchronize the state of the ledger database. Temporary inconsistencies may be reconciled through a consensus algorithm running on one or more of the nodes of the distributed ledger network.

The ledger database may include a blockchain data structure as a method of making and structuring the data comprising the entries in the ledger database. The blockchain data structure may bundle one or more entries into a data block and then generate a value dependent on all data up to any including the data block. Such a data structure may form an "immutable" chain of data in that any later changes in the data (e.g., tampering to try to change an entry in the ledger database) can be detected. Each node of the distributed ledger network may accept and process ledger transactions from a computing device of a user communicating with the distributed ledger network over the network.

An entry in the ledger database may be controlled by a private key. The private key determines who can write to the ledger database, that is, define new ledger transactions. The private key may be an alphanumeric string. The private key may be associated with a public key which is included in the entry of the ledger database. The public key may be referred to as a "public address".

A private key and the corresponding public address may be associated with an asset and/or a number of units of account, and may be generally referred to as a "ledger token". The number of the units of account may be a quantity of cryptocurrency that may be an inherent medium of exchange of the distributed ledger network. The asset the ledger token may be associated with can be a commodity (e.g., gold, fiat currency, corn), an intangible asset (e.g., stocks, bonds), and/or may comprise a self-executing set of software code that operates within the distributed ledger network (e.g., a self-executing contract, or "smart contract"). The entries in the ledger database representing transactions may include transfers of control and/or ownership of a ledger token. The public address may be generated in secret but then exposed so that it can receive ledger tokens and/or cryptocurrency. However, the private key may be generated in secret and only exposed at the time of sending the ledger transaction to move the ledger token from one public address to another.

The private key controlling the ledger token, for example an alphanumeric string, may therefore be seen as the asset of a user of the distributed ledger network. The owner is the user who controls the private key.

Distributed ledger networks may pose a number if challenges for users. First, the private key may be easily copied and stolen. The first user to now act will now be able to transfer the entire ledger token to a new public address solely he or she controls. The true owner may be unaware another person is capable of stealing the true owner's ledger token. Once lost or stolen, the ledger token may be impossible to recover. Some distributed ledger networks include no preferred way to store private keys. This may require technical ability to safely own and transact in ledger tokens and, unless carefully managed, can lead to lost or stolen private keys.

Similarly, a "wallet application" may be a computer program for maintaining one or more instances of the private key. The wallet application may automate some processes (e.g., generation of the public-private key pair), present a more usable interface, and may have the capability to store private keys from multiple instances of the distributed ledger network (e.g., Bitcoin, Ethereum, EOS, Ripple, etc.).

However, the wallet application may also have challenges. The wallet application may often be a general computing device utilized by a user for other purposes (e.g., a smartphone, a desktop computer). This may increase likelihood of hack, theft, or loss due to exposure to what may be many other networks and computer applications. For these reasons a user may decide it is appropriate to store modest amounts of value in the wallet application (e.g., $100, $1000) but not large amounts of value (e.g., $100,000, $1Bn). For valuable ledger tokens, some users have resorted to recording private keys on paper (a form of "cold storage") stored in physical vaults.

There may be significant number of users who may wish to hold a ledger token and/or amount of cryptocurrency but may not wish to risk managing the private key or author authorization means. Rather, they may wish to have a trusted party take custody of a ledger token and/or cryptocurrency on their behalf. This may include a range of investment professionals who have no understanding of the underlying technology but who have prescribed custody requirements for their clients' assets (e.g., prescribed by the Securities and Exchange Commission).

This provides an opportunity for an organization to act as a professional custodian. However, the organization must then meet the technical challenges of managing the private key in the context of what may be corporate-sized computer networks and multiple employees, contractors, or other agents. For example, the private key may now be under threat from internal theft and/or attention by more sophisticated hackers. Even where custody measures have been carefully prescribed, cold storage may create a substantial delay in sending a ledger transaction or converting one instance of the cryptocurrency (e.g., Bitcoin) to another instance of the cryptocurrency (e.g., Ethereum). On the other hand, an electronic login (e.g. via a smartphone app or web portal) that permits sending transactions (e.g., for convenience) utilizing the private key held by the custodian may create hacking risk. For a secure change in custody, an "on-ledger" transaction moving the ledger token from one public address to another public address may be required.

In addition, the distributed ledger network may pose some challenges that may not be experienced in traditional assets and/or custodial environments that can create confusion as to ownership and/or create regulatory compliance risk. For example, a distributed ledger network may have the ability to "fork" (e.g., split into two instances of the distributed ledger network in which the private key may be usable on each fork), the custody may also lead to uncertainty as to who owns the ledger token and/or cryptocurrency of the ledger fork. The organization may also have little or no ability to prevent the transfer of cryptocurrency to the public address of the ledger token that is in custody. This may cause compliance concerns, for example money laundering or other rules implicating acceptance of value. It may be difficult for the organization to predefine the rules for such events sufficient to certain users.

As a result of these challenges, there may continue to be significant cost and/or risk in an organization acting as a custodian of the private key (and/or other authorization data) that confers control and/or ownership of a ledger token and/or any associated quantity of cryptocurrency. The organization may continue to be subject to loss, theft (both internal and external), relatively slow transaction times, regulatory risk, and/or inflexibility in defining automatic procedures for a wide range of circumstances that may arise from the distributed ledger network. The organization may be unable to comply with custody rules and therefore serve a wider userbase. As a result, the organization may lose money, fail to acquire customers, and may be at a competitive disadvantage.

SUMMARY

Disclosed are a method, a device, and a system of secure storage and/or transfer of distributed ledger token through a possession token storing a private key controlling the ledger token.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating a first public-private key pair having a public key usable as a public address of the ledger token of a distributed ledger network and a private key usable to transfer the ledger token of the distributed ledger network from the public address to a different public address. Method may also include verifying that a ledger transaction occurred on the distributed ledger network at least one of (i) associated an asset with the public address, and (ii) transferred the asset to the public address. Method may furthermore include generating a possession token storable in physical memory and having a state of the possession token indicated by a state indicator, where the state of the possession token evolves upon transfer between two computing devices over a network. Method may in addition include cryptographically associating the ledger token and the possession token through incorporation of the public address into data generating the state indicator of the state of the possession token. Method may moreover include encrypting the private key to form an encrypted private key. Method may also include storing the encrypted private key in the possession token. Other embodiments of this aspect include corresponding computer systems, apparatus, and computer programs recorded on one or more computer storage devices, each configured to perform the actions of the methods.

Implementations may include one or more of the following features. Method may include: adding a block to a blockchain data structure of the possession token upon receipt of the possession token by a first computing device; and evolving the state indicator of the possession token. Method may include: transmitting the state indicator to a validation network to store an independent proof of receipt of the possession token by the first computing device. Method may include: transmitting the public address to the first computing device over an encrypted communication channel; generating a second public-private key pair having a client overt key and a client covert key; utilizing the client covert key solely on the first computing device to evolve the state of the possession token; transmitting the client overt key from the first computing device to a server; generating a third public-private key pair having a server overt key and a server covert key; transmitting the client overt key from the server to the first computing device; generating a shared secret from the server covert key and the client overt key; and where the private key is encrypted with the shared secret. Method may include: receiving the possession token over the network; receiving the client covert key over the network; re-calculating the shared secret from the client covert key and the server overt key; determining at least one of the first computing device and an user associated with the first computing device is a record owner of the possession token; determining that each transaction in a blockchain data structure of the possession token is cryptographically associated with each previous transaction of the possession token terminating in an origin hash; and recalculating the origin hash utilizing a set of inputs to a cryptographic hash function outputting the origin hash. Method may include: decrypting the private key stored in the possession token with the shared secret recalculated from the client covert key and the server overt key; reading the public address of the ledger token associated with the possession token; determining the public key exists in a ledger database of the distributed ledger network; extracting the private key from the possession token; determining that the private key is associated with the public key to form the first public-private key pair; and verifying at least one of the ledger token specified in the possession token matches the ledger token as queried from the distributed ledger network. Method may include: inputting the public address as part of an origin data of the possession token to generate the origin hash of the possession token necessarily dependent on the public address; receiving the client overt key of a second computing device associated with the client covert key of the second computing device used to evolve the state of the possession token; generating a second instance of the shared secret utilizing the client overt key of the second computing device and the server covert key; re-encrypting the private key stored in the possession token with the second instance of the shared secret; and deleting the client overt key of the second computing device. Implementations of the described techniques may include hardware, a method or process, or a computer tangible medium.

In one general aspect, method may include generating a first public-private key pair having a public key usable as a public address of a ledger token of a distributed ledger network associated and a private key usable to transfer the ledger token of the distributed ledger network from the public address to a different public address. Method may also include verifying a ledger transaction occurring on the distributed ledger network meets a finality requirement based on a consensus algorithm of the distributed ledger network, the finality requirement with respect to at least one of (i) transferring the asset to the public address and (ii) associating the asset with the public address. Method may furthermore include generating a possession token storable in a memory and having a state of the possession token indicated by a state indicator that evolves upon a transfer between two instances of computing devices, where the state indicator is a state hash that is a hash value dependent on a transaction data associated with the transfer between the two instances of computing devices. Method may in addition include storing the private key usable to transfer the ledger token of the distributed ledger network from the public address to the different public address. Method may moreover include transferring the possession token to a first computing device over a network. Other embodiments of this aspect include corresponding computer systems, apparatus, and computer programs recorded on one or more computer storage devices, each configured to perform the actions of the methods.

Implementations may include one or more of the following features. Method may include: generating a second public-private key pair having a client overt key and a client covert key; utilizing the client covert key solely on the first computing device to evolve the state of the possession token; and transmitting the client overt key from the first computing device to a server. Method may include: generating third public-private key pair having a server overt key and a server covert key; transmitting the client overt key from the server to the first computing device; and generating a shared secret from the server covert key and the client overt key. Method may include: encrypting the private key within the possession token with the shared secret. Method may include: authenticating the first computing device; and determining at least one of the first computing device and an user associated with the first computing device is a record owner of the possession token. Method may include: receiving the possession token over the network; receiving the client covert key over the network; re-calculating the shared secret from the client covert key and the server overt key; determining that each transaction in a blockchain data structure of the possession token is cryptographically associated with each previous transaction of the possession token terminating in an origin hash; and recalculating the origin hash utilizing a set of inputs to a cryptographic hash function outputting the origin hash. Method may include: decrypting the private key stored in the possession token with the shared secret recalculated from the client covert key and the server overt key; reading the public address of the ledger token associated with the possession token; determining the public key exists in a ledger database of the distributed ledger network; extracting the private key from the possession token; determining that the private key is associated with the public key to form the first public-private key pair; verifying at least one of the ledger token specified in the possession token matches the ledger token as queried from the distributed ledger network; transmitting the possession token to a second computing device; receiving the client overt key of the second computing device associated with the client covert key of the second computing device used to evolve the state of the possession token; generating a second instance of the shared secret utilizing the client overt key of the second computing device and the server covert key; re-encrypting the private key stored in the possession token with the second instance of the shared secret; deleting the client overt key of the second computing device; inputting the public address as part of an origin data of the possession token to generate the origin hash of the possession token necessarily dependent on the public address; adding a block to the blockchain data structure of the possession token upon receipt by the first computing device and evolving the state indicator of the possession token; and transmitting the state indicator to a validation network to store an independent proof of receipt of the possession token by the first computing device. Method may include: determining a database fork in the ledger database of the distributed ledger network persists based on at least one of a time, a number of data blocks, and a composition of voting power of a set of computing nodes of the distributed ledger network based on the consensus algorithm, the database fork resulting in a first fork of the distributed ledger network and a second fork of the distributed ledger network; generating a third public-private key pair and a fourth public-private key pair; generating a first data container and a second data container; initiating a re-key transaction on the first fork, the re-key transaction on the first fork to transfer the ledger token of the first fork to a public address of the third public-private key pair; initiating a re-key transaction on the second fork, the re-key transaction on the second fork to transfer the ledger token of the first fork to a public address of the fourth public-private key pair; storing the private key of the third public-private key pair in the first data container; storing the private key of a fourth-public-private key pair in the second data container; transmitting the public key usable as the public address to a wallet application; queuing the ledger transaction on the distributed ledger network; querying a transaction fee of the distributed ledger network; determining the transaction fee is below a threshold value; initiating the ledger transaction on the distributed ledger network; determining at least the ledger token is not subject to a contingency of a self-executing contract of the distributed ledger network; inputting the client covert key into the cryptographic hash function to output a second hash value used as the state indicator; and where the re-key transaction on the first fork and the re-key transaction on the second fork are substantially simultaneous, where the public address is cryptographically tied to the possession token by hashing the public address as the input to the cryptographic hash function outputting the origin hash of the possession token, and where the finality requirement is a threshold number of data blocks in a blockchain data structure of the distributed ledger network within a longest chain of data blocks of the distributed ledger network. Implementations of the described techniques may include hardware, a method or process, or a computer tangible medium.

In one general aspect, system may include a network. System may also include a custody server, having: a processor of the custody server, a memory of the custody server, a ledger key generation engine stored on the memory of the custody server having computer executable instructions that when executed on the processor of the custody server generates a public-private key pair having a private key and a public address, a possession key engine stored on the memory of the custody server having computer executable instructions that when executed on the processor of the custody server: generates a second public-private key pair referred to as a server overt key and a server covert key for exchange over the network for a client overt key to generate a shared secret; and receive as inputs the server overt key and the client overt key and generate the shared secret. System may furthermore include a private key encryption module having computer executable instructions that when executed on the processor of the custody server encrypts the private key with the shared secret. System may in addition include a set of computer executable instructions that when executed on the processor of the custody server: transmit the public address over an encrypted communication channel; and verify a ledger transaction on a distributed ledger network to transfer a ledger token to a public key as the public address meets a finality requirement. System may moreover include a first computing device having: a processor of the first computing device, a memory of the first computing device, and an electronic vault having one or more memory addresses and a token evolution engine having computer executable instructions that when executed on the processor of the first computing device evolves a possession token and generates a state indicator of the possession token. System may also include a treasury server having: a processor of the treasury server, a memory of the treasury server, a transfer engine having computer executable instructions that when executed on the processor of the treasury server determines if an user is a record owner of the possession token in an acceptance record, a set of computer executable instructions that when executed on the processor of the treasury server: issue the possession token over the network. Other embodiments of this aspect include corresponding computer systems, apparatus, and computer programs recorded on one or more computer storage devices, each configured to perform the actions of the methods.

Implementations may include one or more of the following features. System may include: a computing node of a validation network having: a processor of the computing node of the validation network, a memory of the computing node of the validation network, and a ledger database of the validation network having a token ID, the public address, and the state indicator of the possession token associated with the ledger token. System may include: a second computing device, having: a processor of the second computing device, a memory of the second computing device, and a set of computer executable instructions that when executed on the processor of the second computing device: generate a transaction instruction in a protocol of a distributed ledger network to effect the ledger transaction to transfer the ledger token to the public key as the public address; and submit the transaction instruction to a computing node of the distributed ledger network. System may include: the computing node of the distributed ledger network may include: a processor of the computing node of the distributed ledger network, a memory of the computing node of the distributed ledger network, a ledger database of the distributed ledger network stored in a blockchain data structure and having the public address and the ledger token, and the first computing device may include a set of computer readable instructions that when executed on the processor of the first computing device: generate the second public-private key pair having the client overt key and a client covert key; utilize the client covert key solely on the first computing device to evolve a state of the possession token; and transmit the client overt key from the first computing device to a server. System where the treasury server may include: a validation engine having computer executable instructions that when executed on the processor of the treasury server at least one of: determines a last instance of the state indicator of the possession token was generated by the user, determines the possession token has an origin data that is valid, and determines that the private key is associated with the public address. Implementations of the described techniques may include hardware, a method or process, or a computer tangible medium.

BRIEF DESCRIPTION OF THE DRAWINGS

The embodiments of this disclosure are illustrated by way of example and not limitation in the figures of the accompanying drawings, in which like references indicate similar elements and in which:

FIG. 1 illustrates a ledger token possession network in which a private key controlling a ledger token of a distributed ledger network is securely held in a custody server and cryptographically tied to a possession token issued from a treasury server to an electronic vault of a computing device of a user to establish a secure custody of the ledger token, according to one or more embodiments.

FIG. 2 illustrates one example embodiment that may implement the possession token of FIG. 1 that can be associated with the private key, including a cryptographic association, to establish the secure custody, according to one or more embodiments.

FIG. 3 illustrates the distributed ledger network of FIG. 1 along with a wallet application generating a ledger transaction, the distributed ledger network including a computing node of the distributed ledger network, a computing node client, and a ledger storing instances of a block with a ledger token associated with a public address, according to one or more embodiments.

Figure 4:
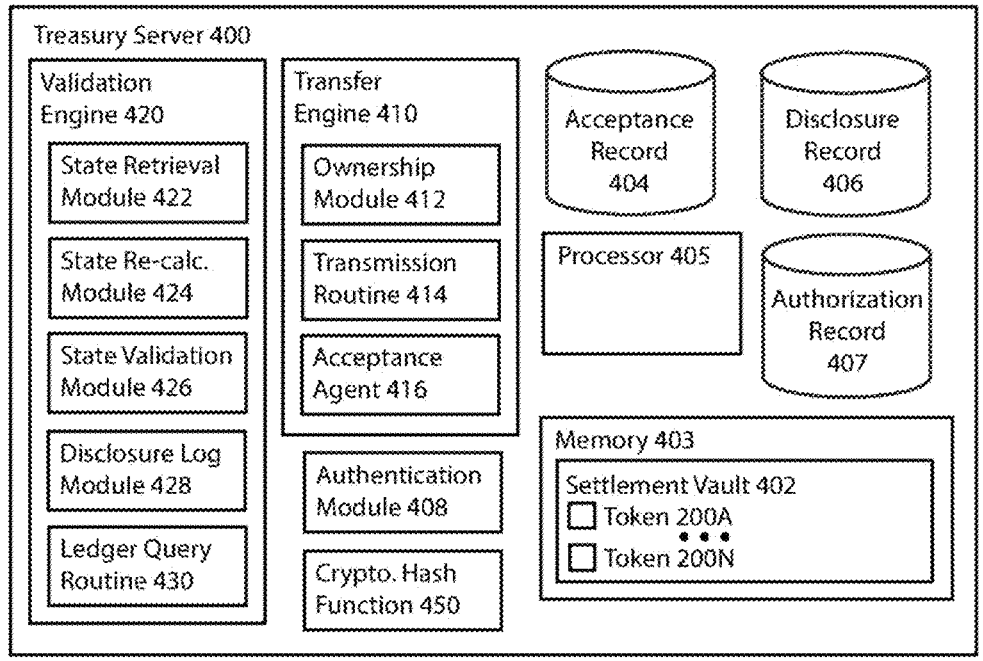
FIG. 4 illustrates the treasury server of FIG. 1 issuing and/or settling the possession token, including a transfer engine, a validation engine, and a memory storing a settlement vault, according to one or more embodiments.

Other features of the present embodiments will be apparent from the accompanying drawings and from the detailed description that follows.

DETAILED DESCRIPTION

Disclosed are a method, a device, a system and/or a manufacture of ledger token transfer of a distributed ledger network through cryptographic binding to a transferrable possession token. Although the present embodiments have been described with reference to specific example embodiments, it will be evident that various modifications and changes may be made to these embodiments without departing from the broader spirit and scope of the various embodiments.

FIG. 1 illustrates a ledger token possession network 190 in which a private key 514 controlling a ledger token 304 of a distributed ledger network 300 is securely held in a custody server 500 and cryptographically tied to a possession token 200 issued from a treasury server 400 to an electronic vault 602 of a computing device 600 of a user 101, according to one or more embodiments. In the embodiment of FIG. 1, a user 101 may control and/or own a ledger token 304 on a distributed ledger network 300. The distributed ledger network 300 may be a network for maintaining a ledger with copies stored on nodes accepting transactions of ledger tokens and reconciled through a consensus algorithm. The ledger may include a blockchain data structure. The distributed ledger network 300 may be, for example, the Bitcoin network, the Bitcoin Cash network, the Ethereum network, the Ethereum Classic network, the Ripple network, and/or the EOS network. The ledger token 304 may be associated with a public address 301 that may be a hash value and/or a string of alphanumeric characters. The ledger token 304 may be associated with an asset (e.g., a physical asset such as a gold bar, an intangible asset such as a bond), and/or have associated an amount of medium of exchange native to the distributed ledger network 300, which may be referred to as a "cryptocurrency". The ledger token 304 may comprise a quantity of cryptocurrency, for example, a BTC, an ETH, an XRP. The ledger token 304 may also comprise and/or be subject to self-executing code of the distributed ledger network (e.g., a smart contract).

The ledger token 304 of FIG. 1 is controlled by a private key 114 that may cryptographically derive from the public address 501 (e.g., a public-private key pair). The private key 114 may be stored in any number of locations, for example in a memory 103 of a computing device 100 (e.g., as a flat file), within the memory 103 stored and accessed by a wallet application 102, and/or even written on a piece of paper (e.g., "cold storage").

The user 101 may be an individual acting on his own behalf, or acting on the behalf of another individual or organization, including a financial institution. The user 101 may wish the ledger token 304 to be held in custody by a custodian (e.g., a bank, a different financial institution, a brokerage). For example, the user 101 may be concerned that he or she may lose the computing device 100 storing the private key 114, that the private key 114 may get hacked, and/or that the wallet application 102 may get hacked or may be subject to data corruption. The user 101 may also be investing the token on behalf of another and may be regulatorily required to utilize a custodian.

To securely custody the ledger token 304, the user 101 may submit a request to the custody server 500. As shown and described in conjunction with FIG. 8, the custody server 500 generates a new public-private key pair utilizing the ledger key engine 504, the new public-private key pair comprising the public address 501 and a private key 514. The public address 501 may be returned to the computing device 100 of the user 101 to be utilized in formulating a transaction (e.g., the ledger transaction 110 of FIG. 3) to be submitted to the distributed ledger network 300 transferring the ledger token 304 from the public address 301 to the public address 501. The custody server 500 may then verify the transaction completed within a finality threshold, as shown and described throughout the present embodiments. In one or more embodiments, the finality requirement may be a threshold number of data blocks 308 in a blockchain data structure of the distributed ledger network 300 within a longest chain of the data blocks 308. The private key 514 may be stored in the custody server within a data container 502 comprising a token ID 201, the public address 301, and the private key 514 which may be encrypted, for example as shown and described in conjunction with FIG. 10.

In one or more alternate embodiments, the user 101 may submit other value in exchange for the possession token 200. For example, the ledger token 304 may be transferred from a public address 301 controlled by an exchange or other inventory provider to the public address 501 (such exchange or other inventory provider not shown in the embodiment of FIG. 1).

Once association of the ledger token 304 to the public address 103B is verified, the treasury server 400 may issue a possession token 200 over the network 150 to a computing device 600 of the user 101 that may be bound to the data container 502 and/or the data of the ledger token 304 stored in the data container 502. For example, the binding may be established by cryptographically tying the possession token 200 to the public address 301 and/or the token ID 201.

The possession token 200, as shown and described in conjunction with FIG. 2 and throughout the present embodiments, is a set of electronic stored information that may remain unique and may evolve upon transfer between two or more end points (e.g., instances of the electronic vault 602). In one or more embodiments, the possession token 200 is evolved by the electronic vault 602 stored on a computing device 600. The electronic vault 602 may include secure allocated memory (e.g., the memory 603) and a token evolution engine 604 comprising a set of computer readable instructions that may evolve the possession token 200, for example at the time the computing device 600 receives the possession token 200. As described throughout, a number of aspects ensure this issuance process may be secure and the possession token 200 may not be copied or hacked. Thus, following issuance, a single instance of the possession token 200 will be issued in association with and/or bound to the ledger token 304.

In one or more embodiments, evidence and/or proof that the issuance in possession occurred may be communicated to a validation network 700. In one or more embodiments, the validation network 700 may use some technological elements of the distributed ledger network 300, and could for example comprise one or more instances of a computing node (e.g., the computing node 702), a ledger of the validation network 700 (e.g., the ledger database 706), and/or a consensus mechanism of the validation network 700. The validation network 700 may store the token ID 201 of the possession token 200, the public address 301, and/or a state indicator 701 providing evidence of a last state of evolution of the possession token 200.

Figure 14:
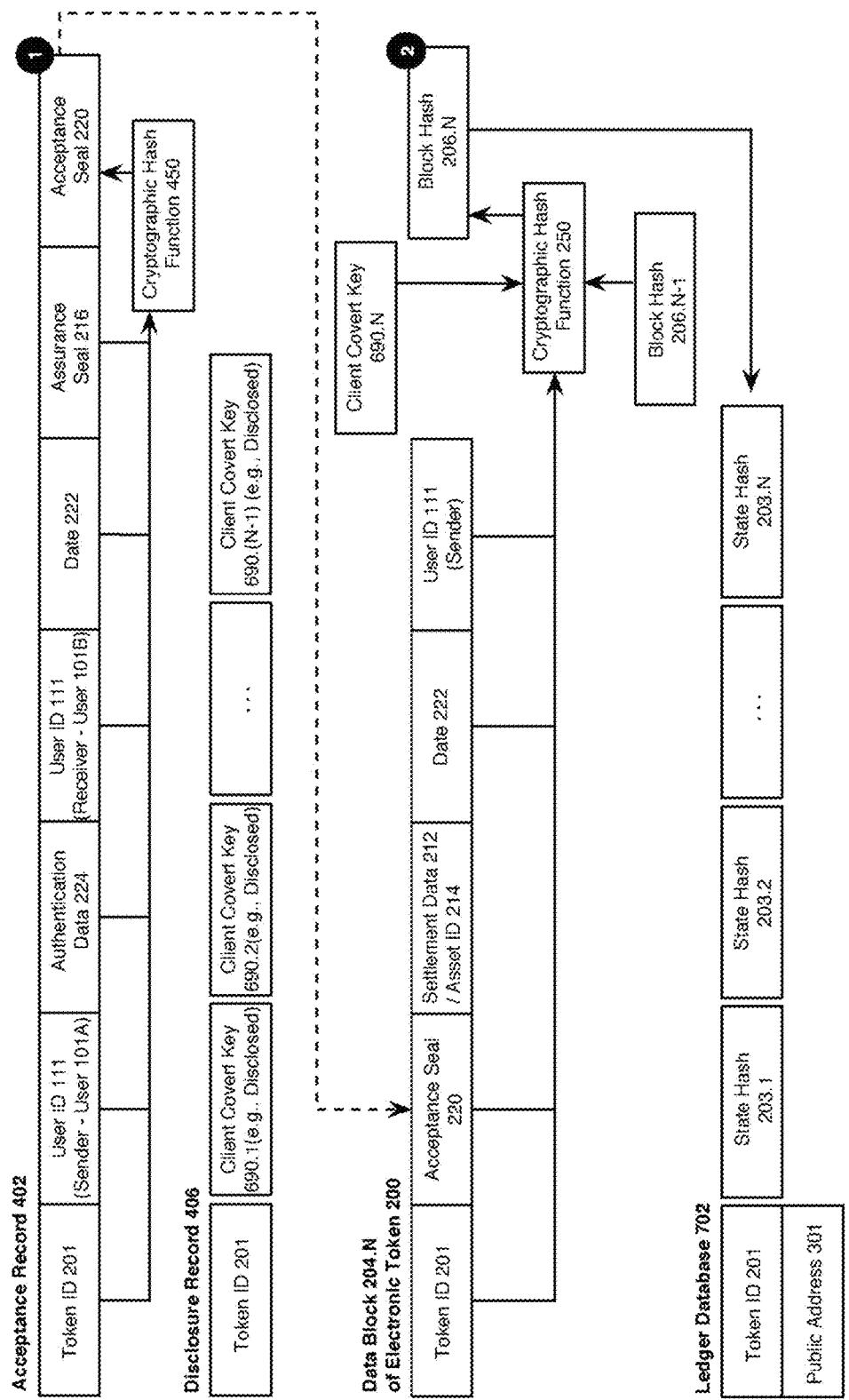
FIG. 14 illustrates a transfer transaction between users that may securely change ownership of the ledger token without changing the custodian, exposing the private key, or initiating a ledger transaction of the distributed ledger network such that a risk of exposure of the private key may be reduced and speed and certainty of settlement may be increased, according to one or more embodiments.

The possession token 200 may then be subsequently transferred between two or more instances of the computing device 600 each controlled by an instance of the user 101. On each transfer, the possession token 200 may be communicated through the network 150 to the treasury server 400 which may temporarily store the possession token in a settlement vault 402 while validating the possession token 200. Validation may include but is not limited to verifying an owner of record in an acceptance record 404, the public address 501, a chain of transactions of the possession token 200, and/or evidence in the validation network including the state indicator 701. A validation engine 420 may then reconvey the possession token 200 to a different user 101 (not shown in the embodiment of FIG. 1) where the possession token 200 may again be placed into a new instance of the electronic vault 602 and may be evolved and/or generate evidence for the validation network 700. The embodiment of FIG. 14 illustrates an instance of the transfer transaction of the possession token 200.

Figure 10:
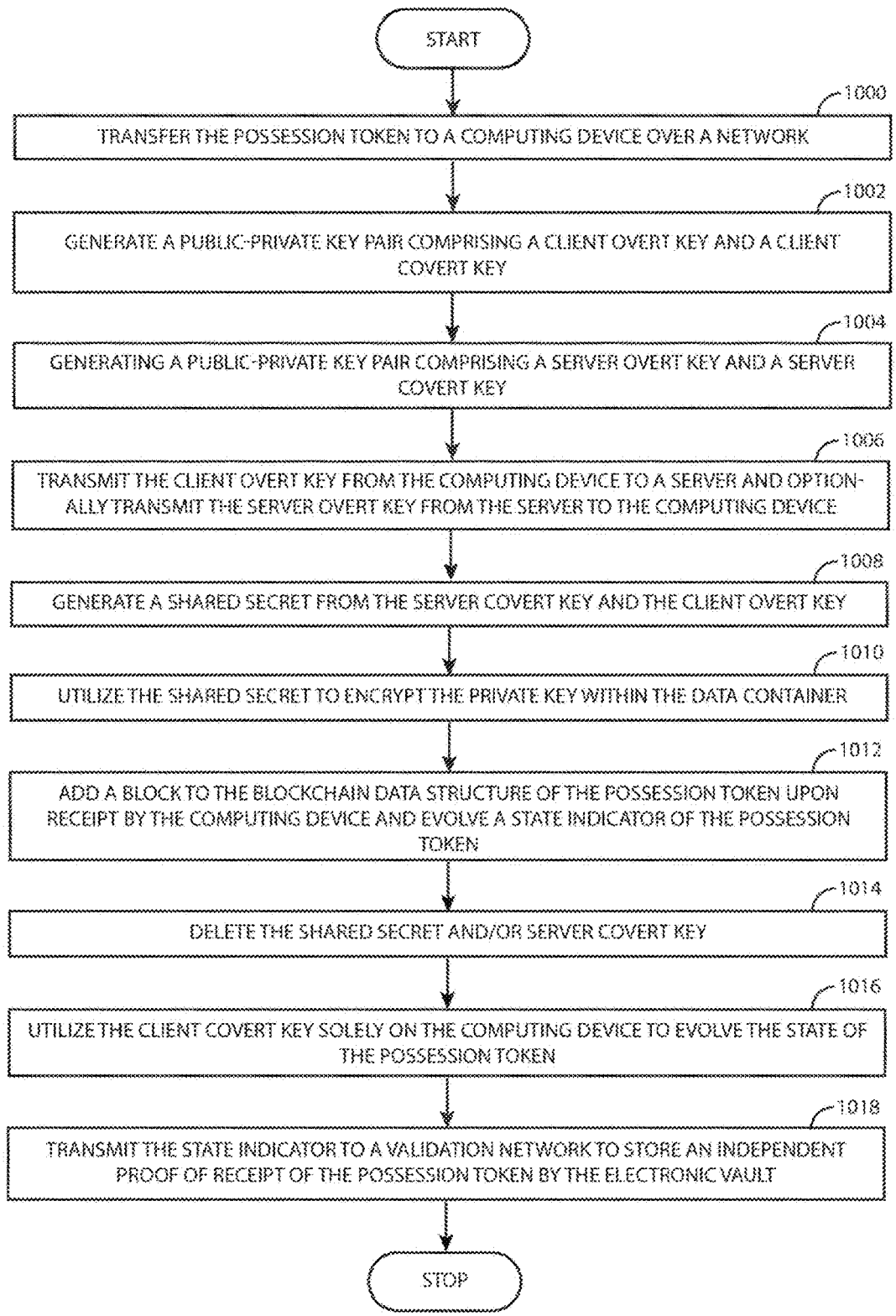
FIG. 10 is a possession token key exchange process flow illustrating a method by which the private key can be encrypted with a shared secret generated between a server computing device (e.g., the custody server of FIG. 5) and a client computing device (e.g., the computing device of FIG. 6), a client covert key of the shared secret also usable to evolve a state indicator of the possession token (e.g., the possession token of FIG. 2), according to one or more embodiments.

In one or more embodiments, an encryption procedure between the computing device 600 and the treasury server 400 may ensure the private key 514 is encrypted by data generated by the a last instance of the computing device 600 that possesses the possession token 200 in the electronic vault 602, as shown and described in conjunction with FIG. 10.

A redemption process may work an approximately reverse process. The user 101 may provide a public address 301 (e.g. a public address 301X, not shown in the embodiment of FIG. 1) to the custody server 500 along with submit the possession token 200. Upon validation of the possession token 200 (e.g., by the process of the embodiment of FIG. 11 and/or FIG. 12), the custody server 500 may initiate a ledger transaction 110 transferring the ledger token 304 from the public address 501 to the public address 301X. Upon verification the ledger token 304 has attached to the public address 301X that meets a threshold requirement, the possession token 200 may in one or more embodiments be placed back in a treasury stock (e.g., for use in a new issuance transaction with a new instance of a ledger token 304).

As a result of the ledger token possession network 190, the user 101 may be able to securely custody the ledger token 304 and/or the associated quantity 318 of cryptocurrency with an organization operating the custody server 500 and/or the treasury server 400. The private key 514 may be stored exclusively on the custody server 500, and may be encrypted with data of the last owner of the possession token 200 that may reduce risk of theft or hacking. Subsequence transactions in transferring the possession token 200 between instances of the user 101 may occur without initiation an "on chain" transaction of the distributed ledger network 300 that may otherwise cost additional time, expense (e.g., transaction and/or mining fees of the distributed ledger network 300), and/or security risk. The organization operating the custody server 500 and/or the treasury server 400 may be able to authenticate users 101, define flexible trading rules for the ledger token 304 and/or the possession token 200, and appeal to users 101 who may wish for an independent check on control of the treasury server 400, for example by being in actual possession of the possession token 200 and having access to the validation network 700, which may also be independently operated.

While the ledger token 304 is described as "held in" the custody server 500, it will be understood by one skilled in the art that it is the private key 514 that is stored in the custody server 500. That is, the custody server 500 may store the private key 514 associated with the public address 301 of the ledger token 304 where the private key 514 controls transfer of the ledger token 304 within the ledger database 306. In one or more embodiments, the ledger token 306 may include a cryptocurrency value (e.g., the quantity 318 of FIG. 3). The computing device 100 and the computing device 600 may be a desktop computer, a laptop computer, a tablet device, a smartphone, or another type of computing device. The computing device 100 and the computing device 600 may be separate or may be implemented on the same instance of a computing device (e.g., the same smartphone, the same desktop computer, the same server computer, etc.). The network 150 may be a communication network such as a local area network, a wide area network, a virtual private network, the Internet, and/or a combination of such networks.

FIG. 2 illustrates the possession token 200 of FIG. 1, according to one or more embodiments. The uniqueness of a collection of bits (e.g., the bits comprising the possession token 200) may be created through a forward moving state machine which may have a state evolution upon an event, for example enforced at an issue transaction 160.1 and each subsequent transfer transaction 160.2 to transfer transaction 160.N between instances of the electronic vault 602. Specifically, the possession token 200 of FIG. 2 comprises one or more data blocks 204 in a sequence, each having a transaction data 202, and a block hash 206 that is the output of a cryptographic hash function (e.g., the cryptographic hash function 450, the cryptographic hash function 530) with inputs comprising a previous data block 204 in the sequence. Each data block 204, transaction data 202, block hash 206, may be described with a decimal point followed by a number to indicate its position in the sequence (e.g., data block 204.1 of the issue transaction 160.1, transaction data 202.55 of a transfer transaction 160.55 that is the fifty-fifth transaction). In the present embodiments, a reference "N" may be associated with one or more transactions and/or evolution states of the possession token 200. For example, the sequence of previous transfer transactions 160.2 through 110.N−2 leads to the previous transfer transaction 160.N−1, and to the current transfer transaction 160.N, and next to a new transfer transaction 160.N+1.

The block hash 206 of the issue transaction 160.1 may have no previous block hash 206, but instead optionally utilize an origin hash 208 and/or a cryptographic data tie 207. Each instance of the possession token 200 may therefore be seeded, or originate, with the origin hash 208 and/or the cryptographic tie data 207. The origin hash 208 for example can be a character string generated from data (e.g., data of an authorization process of the possession token 200, a hash of data of the data container 502) a number, and/or a nonce. In one or more embodiments, the origin hash 208 may be a hash value generated by a cryptographic hash function 1350, as shown and described in conjunction with the embodiment of FIG. 13. In one or more other embodiments, the origin hash 208 may derive from a unique physical origin recorded on a permanent media, referred to as a "proof". Each instance of the possession token 200 may have a unique identifier (e.g., the token ID 201) which may allow for addressability of the possession token 200 after any state evolution in a state history, for example a globally unique identifier (GUID). In one or more embodiments, the data of the data container 502 may be hashed with a cryptographic hash function 450 to output a hash value of the data container 502. The hash value of the data container 502 may then be input as part of an origin data of the possession token 200 to generate the origin hash 208 of the possession token 200 that is necessarily dependent on the hash value of the data container 502.

In the embodiment of FIG. 2, the issue transaction 160.1 generates the transaction data 202.1 which is consolidated as the data block 204.1 when the block hash 206.1 is calculated as an initial state of the possession token 200 (e.g., the state hash 203.1). The transaction data 202 may include, for example, the token ID 201, a user ID 111 associated with a user 101 and/or an electronic vault 602, a public address 301, an assurance seal 216, and/or a date 222. The settlement data 212 may be data describing a related transaction which resulted in issuance of the possession token 200, for example payment through an asset exchange or a token exchange. The assurance seal 216 may be the output of a cryptographic hash function with inputs comprising a settlement data related to information about the issuance of the possession token 200 tied to the ledger token 304. Alternatively, or in addition, the settlement data, and/or the assurance seal 216 may not be included in the data block 204.1, but may be input into the cryptographic hash function 1350 such that the origin hash 208 is dependent and can later be traced solely by the treasury server 400. The date 222 may be a time and/or a date of the transfer transaction 160.N creating an instance of the data bock 204. The user ID 111 is unnecessary as possession of the possession token 200 in its evolved state determines ownership, but the user ID 111 may be useful in providing additional data to the cryptographic hash function 450, the cryptographic hash function 530, and/or to track ownership at each state in the evolution of the possession token 200.

The block hash 206 is the output of a cryptographic hash function with inputs comprising the transaction data 202, a client covert key 690, and, in one or more embodiments, an origin hash 208. In one or more preferred embodiments, the client covert key 690 is generated and stored by the electronic vault 602 without any communication of the client covert key 690 over the network 150 until such time as the user 101 issues an instruction to transfer the possession token 200 (e.g., the transfer instruction). An instance of the client covert key 690 may be encrypted and stored on the memory 605 for each instance of the possession token 200 stored in the electronic vault 602. In one or more alternate embodiments, the client covert key 690 can be generated and/or stored on a separate computing device. Upon transfer, the client covert key 690 may be turned in (e.g., to the treasury server 400) to prove that the most evolved state of the possession token 200 was generated by the user 101 and/or the electronic vault 602 of the user 101, as described throughout the present embodiments. The client covert key 690 is shown and described further in conjunction with FIG. 10.

The data block 204 comprises a transaction data 202.2 that may include similar elements to the transaction data 202.1, and in addition may include a user ID 111 of a receiver of possession of the possession token 200 following the transfer transaction 160.2, a user ID 111 of a sender who transferred possession of the possession token 200 after initiating the transfer transaction 160.2, an acceptance data 218, and an acceptance seal 220. The acceptance data 218 may include additional data relating to a time, a method, a geospatial coordinate, an IP address, a device MAC address, or other data describing or relevant to the transaction 160. Alternatively, or in addition, the acceptance data 218 can be hashed into an acceptance seal 220. In such case, the acceptance seal 220 can be included in the transaction data 202 whereas the acceptance data 218 can be stored elseware (e.g., the acceptance record 404).

FIG. 2, for clarity, illustrates the possession token 200 after undergoing only three instances of the transactions 160: an issue transaction 160.1, a transfer transaction 160.2, and a transfer transaction 160.3. However, the possession token may undergo hundreds, thousands, or many more instances of the transaction 160. A most recent transaction 160 is referred to as a current transfer transaction, and a transaction 160 immediately preceding the current transfer transaction is a previous transfer transaction. In reference to the current transfer transaction, the following transaction to be initiated is referred to as a next transfer transaction. Any of the foregoing transactions may be designated as the reference 'N' for explanatory purposes with a transaction before 'N' as 'N−1' and a transaction after 'N' as 'N+1'.

Each block hash 206 is the output of a cryptographic hash function 250 with inputs comprising a previous block hash 206 (except in the case of the block hash 206.1 of the issue transaction 160.1). In FIG. 2, the block hash of 206.2 is dependent on and draws a dependency 210 to the transaction data 202.1. The block hash 206.3 is dependent on and draws a dependency 210 to the transaction data 202.2 (and by extension to the transaction data 201.1). More generally, a block hash 206.N is dependent (e.g., draws a dependency 210) on a transaction data 202. (N−1). The set of dependencies 210A through 210N based on hash functions may be referred to as forming a hash chain.

Although not shown in FIG. 2, in one or more embodiments, the client covert key 690.N if disclosed to the treasury server 400 during a transfer transaction 160.N+1 and included in the transaction data 202.N+1 of the next transfer transaction 160.N+1, such that the user 101 who is the possessor of the possession token 200 can re-calculate the block hash 206.N of the possession token 200. Where the client covert key 690 that is disclosed thereafter is included with the possession token 200 (except the client covert key 690 utilized in the most recent token evolution), the user 101 may be able to calculate and verify each block hash 206 of the possession token 200.

The state hash 203 represents an evolved state of the possession token 200 following completion of a transaction 160, and is an illustrative instance of the state indicator 701.1. In the embodiment of FIG. 2, a most recent state of the possession token 200 is the state hash 203.3. As shown and described in FIG. 3, the state hash 203 may be implemented as a value other than a block hash 206 but that necessarily depends on the block hash 206. FIG. 2 illustrates an instance of the possession token 200 retaining each set of data blocks 204 for each transfer transaction 160. However, in one or more embodiments, the possession token 200 is only a subset of the data blocks 204 in the possession token 200's transaction history. For example, a hash tree (e.g., a Merkle tree) may implement the possession token of FIG. 2, according to one or more embodiments.

FIG. 3 illustrates the distributed ledger network 300 of FIG. 1 and a wallet application 102 (e.g., stored on the computing device 100) generating a ledger transaction 110, the distributed ledger network 300 including a computing node 302.1 of the distributed ledger network 300, a node client 312, and a ledger database 306 storing instances of a data block 308.1 with a ledger token 304 associated with a public address 301, according to one or more embodiments. The distributed ledger network 300 may be a network for maintaining the ledger database 306 with copies stored of the ledger database 306 on two or more instances of the node 302 accepting transactions (e.g., the ledger transaction 110) moving ownership of, control of, and/or otherwise manipulating the ledger tokens 304. The node 302 may be a computing device (e.g., a server computer) that includes the processor 305 and the memory 303. However, the node 302 may also be a desktop computer, a laptop computer, an internet of things (IoT) device, a smartphone, etc. The node 302 may be a "full" node comprising a complete instance of the ledger database 306, or may be a "partial" or "lite" node comprising less than the complete instance of the ledger database 306. The instances of the ledger database 306 stored by instances of the node 302 (e.g., the node 302.1 through the node 302.N) that may be reconciled through a consensus algorithm 314. For example, the consensus algorithm 314 may be based on a proof-of-work, a proof-of-stake, a Byzantine fault tolerance, a raft algorithm, etc. The ledger database 306 may be a database of transaction data of the distributed ledger network 300. The ledger may include a blockchain data structure whereby data of an instance of the data block 308 is input into a hash function and a hash value that is the output of the hash function may be incorporated into data of a next instance of the data block 308.

The computing device 100 may be a device comprising a processor 105 and a memory 103 utilized by a user (e.g., the user 101) to run the wallet application 102 that may locally store and manage the private key 114 associated with the public address 301. The wallet application 102 may include a ledger transaction generation routine 104 (in the embodiment of FIG. 3 and throughout this written description and the accompanying drawings "transaction" may be abbreviated as "TXN"). The ledger transaction generation routine 104 may generate a ledger transaction 110 upon request of the user 101. For example, the user may select the public address 301 which may have associated 4.2 BTC. The ledger transaction generation routine 104 may comprise computer readable instructions that when executed on the processor 105 generate the ledger transaction 110 in a protocol of the distributed ledger network 300. For example, where the distributed ledger network 300 is the Bitcoin network, the protocol would be the Bitcoin protocol for sending a ledger transaction 110 to the Bitcoin network. The wallet application 102 may further comprising a ledger transaction submission routine 106 that comprises computer readable instructions that when executed on the processor 105 transmit the ledger transaction 110 to one or more instances of the node 302 that the computing device 100 may have established a connection with. For example, the ledger transaction submission routine 106 may transmit the ledger transaction 110 to one or more IP addresses associated with an instance of the node 302 over the network 150.

The wallet application 102 may further comprise the public address generation routine 108 comprising computer readable instructions that when executed on the processor generate a public-private key pair for use as an instance of the private key 114 and the public address 301. For example, the public address 301 and the associated private key 114 may have been initially generated using the public address generation routine 108.

The private key 114 may be a single unsigned 256 bit integer (32 bytes). A Bitcoin address is a 160-bit hash of the public-portion of a public/private ECDSA key-pair. Using public-key cryptography, the computing device 100 can "sign" the ledger transaction 110 with the private key 114 and distributed ledger network 300 can verify that the signature is valid. In one or more embodiments, a hardware wallet may be utilized. In one or more embodiments, the wallet application 102 may be a multi-signature wallet.

The ledger transaction 110 illustrates a transaction communicated to the distributed ledger network 300 to transfer the ledger token 304 from one public address 301 to another public address 301 (e.g., possibly from the control of one user to another user). The ledger transaction 110 is shown as a representative application-layer protocol, although one skilled in the art will recognize that each of the elements that comprise the ledger transaction 110 may occurring in different order within the protocol and may be different memory sizes. The public address 301 may be the instance of the public address 301 from which the ledger transaction 110 is sent. The private key 114 (and/or data associated with and/or derived from the private key 114) may be communicated to "sign" the ledger transaction 110. The quantity 318 may specify a quantity of cryptocurrency associated with the ledger token 304, or a portion of such amount, to transfer to the public address 501. Although not shown, the ledger transaction 110 may also specify a second public address 301 (e.g., a public address 301C and/or the public address 301) where any "change" or remainder of the cryptocurrency amount can be returned. The public address 501 may specify a destination public address 301. The transaction fee 320 may specify an amount of cryptocurrency that the ledger transaction will pay to one or more operators of the nodes 302 as a reward for processing the ledger transaction 110. Finally, the ledger transaction 110 may include the metadata 322 that may be additional data related to the ledger transaction 110, and/or the ledger token 304. In one or more embodiments, the metadata 322 may include data related to the possession token 200 that may become associated with the ledger token 304. As shown and described in the present embodiments, the public address 501 may be associated with the private key 514 generated by and stored on the custody server 500.

FIG. 4 illustrates the treasury server 400 of FIG. 1, including an acceptance record 404, a disclosure record 406, a transfer engine 410, and a validation engine 420, according to one or more embodiments. The treasury server 400 issues and facilitates transfer of one or more stances of the possession token 200 that may be associated with one or more instances of the ledger token 304, the public address 301 of the ledger token 304, and/or the private key 514 of the ledger token 304, as further shown and described throughout the present embodiments. The treasury server 400 is a computing device (e.g., a server computer that may be located in a data center) having a computer processor 405 and a memory 403. The memory 403 (and each of instance of the memory in the present embodiments such as the memory 103, the memory 303, the memory 503) may be, for example, RAM, a memristor, an optical storage drive, a solid state memory, etc. An authentication module 408 comprises computer readable instructions that when executed on the processor authenticates an instance of the user 101, the electronic vault 602, and/or the computing device 600 implementing the electronic vault 602. The acceptance record 404 may store data for each instance of the possession token 200 related to transactions 160, acceptance data 218 related to acceptance of the possession token 200 by one or more instances of the user 101, the acceptance seal 220, settlement data 212, the assurance seal 216, and other data. The treasury server 400 includes a cryptographic hash function 450 (e.g., SHA1, SHA256, SHA512-256).

The transfer engine 410 comprises computer readable instructions that when executed on the processor 405 of the treasury server 400 carry out a number of functions related to transfer and clearing the possession token 200. For example, an ownership module 412 may determine if an instance of the user 101 listed as a last possessor of the possession token 200 (which may be referred to as a "record owner") in the acceptance record 404 or another accessible database matches an instance of the user 101 initiating a transfer transaction 160 and/or the user ID 111 ("receiver") field of the current data block 204.N. The transmission routine 144 coordinates what is known in the art as a database transaction (also referred to as ACID compliance, or an ACID transaction), in which the transaction 160 must completely resolve or otherwise fail, and if fail then "rollback" to a previous state in time. The acceptance agent 416 may request, receive, and/or process additional acceptance for completion of the transaction 160. For example, a biometric authentication may be required where a transaction 160 would transfer more than one thousand instances of the possession token 200. Examples of the acceptance record 404 are shown and described in FIG. 12 and FIG. 13. Upon any roll-back, however, the state of the possession token 200 may be evolved again to ensure the disclosed instance of the client covert key 690 is not misused, in which case a transaction 160 may be defined in which the sender and receiver may have the same user ID 111 in the current data block 204.N.

The validation engine 420 comprises computer readable instructions that when executed on the processor 405 of the treasury server 400 carry out a number of functions related to validating an instance of the possession token 200 after a transfer transaction 160 is initiated. For example, the validation engine 420 may carry out any of the functions of the process flow of FIG. 11 and FIG. 12, as may be further divided into modules and routines. A state retrieval module 422 may query the ledger database 706 to retrieve a state indicator 701 (e.g., such as a state hash 203), block hashes 206, and/or data of a hash tree that are stored in the ledger database 706, for example by sending a request to the validation network 700 over the network 150. In one or more embodiments, the state retrieval module 422 may retrieve the entire state history of the possession token 200 that may be stored in the validation network 700. The state re-calculation routine 424 may re-calculate one or more instances of the state hash 203 of the possession token 200, which may pass the result to a state validation module 426 that may compare the retrieved state and the re-calculated state to determine a match to validate one or more state evolutions of the possession token 200. A disclosure log module 428 may retrieve and store the client covert key 690 (e.g., the client covert key 690. (N−1) used to evolve the data block 204. (N−1) that formed before the current transfer transaction 160.N was initiated) in the disclosure record 406, for example in association with the token ID 201 as shown in FIG. 14. The ledger query routine 430 comprises computer readable instructions that when executed on the processor determines the public address 501 of the ledger token 304 associated with the possession token 200 and verifies that the public address 501 is an existing public address 501 within the distributed ledger network 300 and/or that a quantity 318 of cryptocurrency is associated with the ledger token 304. For example, the ledger query routine 430 may call for the public address 501 (e.g., from the custody server 500) and then submit the public address 501 to a node 302 of the distributed ledger network 300 (or otherwise reference a copy of the ledger database 306) and have returned the cryptocurrency amount associated with the public address 501. Some of the processes that the validation engine 420 may effect are shown and described in conjunction with the process flow of FIG. 9.

The treasury server 400 comprises a settlement vault 402. The settlement vault 402 may operate similarly to the electronic vault 602 of the computing device 600 in one or more embodiments. In one or more other embodiments, the treasury server 400 may temporarily store the possession token 200 in the settlement vault 403 before the issue transaction 160.1 (e.g., upon waiting for verification the ledger token 304 met a finality threshold to be associated with the public address 301) and/or during transfer (e.g., the transfer transaction 160.2). In one or more embodiments, the settlement vault 402 may evolve the possession token 200 (e.g., create a new state) when the possession token 200 is transferred to the treasury server 400. In one or more other embodiments, the possession token 200 does not evolve when held in the settlement vault 402.

Figure 5:
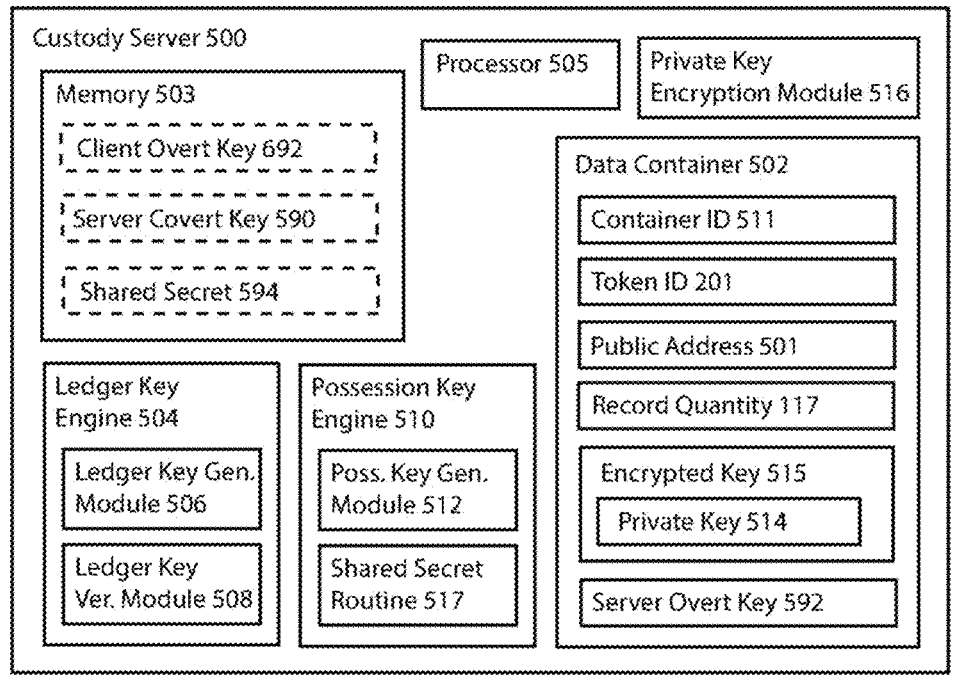
FIG. 5 illustrates the custody server of FIG. 1 storing within a data container the private key associated with the public address of the distributed ledger network of FIG. 3, including a ledger key engine and a possession key generation engine, according to one or more embodiments.

FIG. 5 illustrates the custody server 500 of FIG. 1 storing within a data container 502 the private key 514 associated with the public address 501 of the distributed ledger network 300 of FIG. 3, including a ledger key engine 504 and a possession key engine 510, according to one or more embodiments. The custody server 500 comprises a processor 505 and a memory 503.

The memory 503 may store one or more instances of a data container 502. Each instance of the data container 502 may comprise a container ID 511 to uniquely address the data container 502. The data container 502 may be stored in a variety of commercial databases (e.g., MongoDB, FoundationDB, Vescel.io). The data container 502 stores the private key 514 that is associated with the public address 501. In one or more embodiments, the private key 514 is encrypted as the encrypted key 515. The encrypted key 515 may be encrypted with data generated in association with a key-exchange between the custody server 500 and the computing device 600, as shown and described in conjunction with FIG. 10. The data container 502 may comprise one or more pieces of data associating the possession token 200 with the ledger token 304. For example, the data container 502 may comprise a token ID 201 of the possession token 200 that is a unique identifier of the possession token 200, the public address 501, and/or the private key 514 from which the public address 501 may be able to be mathematically derived. The data container 502 may also store a record quantity 117 of the cryptocurrency amount of the ledger token 304 (e.g., at a time of the issue transaction 160.1, at the time of the transfer transaction 160.N, etc.).

The ledger key engine 504 generates a public-private key pair compatible with the ledger database 306 of the distributed ledger network 300 and verifies settlement and/or receipt of the ledger token 304. A ledger key generation module 506 comprises computer readable instructions that when executed on a processor generates the public-private key pair comprising the private key 514 and the public address 501. A ledger key verification module 508 comprises computer readable instructions that when executed on a processor verifies that the ledger token 304 (including any quantity 318) has attached to and/or associated with the public address 501, optionally within a threshold requirement for settlement.

In addition to the private key 514 and/or the encrypted key 515, the custody server 500 may store, whether temporarily (e.g., a few milliseconds) or for longer periods several other keys, as may be generated by and/or utilized by the possession key engine 510. The custody server 500 may comprise a client overt key 692 received from the computing device 600, a server covert key 590 generated as a private key of a public-private key pair utilized for the key exchange with the computing device 600, and a shared secret 594 generated from the client overt key 692 and the server covert key 590 (e.g., by way of a Diffie-Hellman key exchange protocol). The possession key engine 510 comprises a possession key generation module 512 and a shared secret routine 517. The possession key generation module 512 comprises computer readable instructions that when executed on a processor generates a public-private key pair referred to as the server overt key 592 and the server covert key 590, which may ultimately be utilized in encrypting the private key 514 to generate the encrypted key 515. In one or more embodiments, the server overt key 592 is exchanged over the network 150 for the client overt key 692. The shared secret routine 517 comprising computer readable instructions that when executed on a processor receive as inputs the server overt key 592 and the client overt key 692 and generates the shared secret 594. The shared secret 594 may be established at the start of a communication session between the custody server 500 and the computing device 600 using what may be known in the art as a key-agreement protocol.

The private key encryption module 516 comprises computer readable instructions that when executed on a processor receives the shared secret 594 as a first input to an encryption algorithm and utilizes the shared secret 594 as a second input to the encryption algorithm to encrypt the private key 514, resulting in to output of the encrypted key 515. The private key encryption module may in one or more embodiments discard the shared secret 594. Similarly, the client overt key 692 may also be discarded. The custody server 500 may, however, continue to store the server overt key 592 for later re-generation of the shared secret 594 upon a transfer request of the possession token 200, the shared secret 594 re-generated from both the server overt key 592 and the shared secret 594 as may be sent by, and subsequently received from, the computing device 600.

Figure 6:
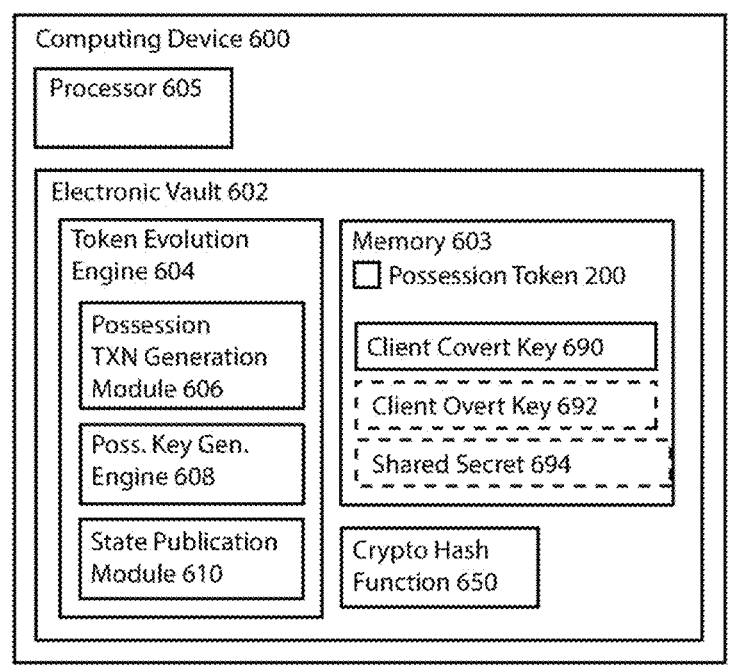
FIG. 6 illustrates the computing device of FIG. 1 comprising the electronic vault storing the possession token (e.g., the possession token of FIG. 2), according to one or more embodiments.

FIG. 6 illustrates the computing device of FIG. 1 comprising the electronic vault 602 storing the possession token 200 (e.g., the possession token 200 of the embodiment of FIG. 2), according to one or more embodiments. The computing device 600 may be a desktop computer, laptop computer, smartphone, server computer, a wearable computing device (e.g., a smartwatch), and/or a special purpose hardware device. Similarly, in one or more embodiments, the electronic vault 602 may be implemented as an application program on a tablet computer, a laptop computer, a desktop computer, a server computer, a smartphone, and/or a special purpose hardware device wherein the processes of the token evolution engine are effected by an application specific integrated circuit (ASIC). The computing device 600 comprises a processor 605 and a memory 603. The memory 603 may store one or more instances of the possession token 200, one or more instances of the client covert key 690 that in one or more embodiments may be used to evolve the instances of the stored possession token 200, and/or computer readable instructions that, where the possession token 200 evolves in state, implements the token evolution engine 604.

The token evolution engine 604 may comprise a possession transaction generation module 606, a possession key generation engine 608, and a state publication module 610. The possession transaction generation module 606 (denoted "possession TXN generation module 606") assembles the transaction data 202 of a newly forming data block 204. The possession key generation engine 608 generates a public-private key pair comprising gathering an entropic input from an entropy source to generate as an output the client covert key 690 and the client overt key 692. The client covert key 690 may be passed into a cryptographic hash function (e.g., the cryptographic hash function 250 of FIG. 2, for example SHA1, SHA256, SHA512-256) to output a block hash 206 and/or an evolved instance of the state hash 203. A state publication module 610 publishes the state hash 203 of the evolved instance of the possession token 200, for example to the validation network 700.

The client covert key 690 associated with an instance of the possession token 200 may be retained following receipt of the possession token 200 and any evolution of the possession token 200. However, in one or more embodiments, the client overt key 692 may be discarded. Where the computing device 600 received the server overt key 592 and any shared secret was generated (e.g., the shared secret 694 that equals the shared secret 594 as calculated by the treasury server), the shared secret may also be discarded.

In one or more embodiments, the electronic vault 602 may be implemented on a computing device 600, and may share or utilize a memory 603 of the computing device 600 and/or a processor 605 of the computing device 600. In the embodiment of FIG. 6, the memory 603 is shown within the electronic vault 602 which may illustrate a set of memory addresses of the memory 603 exclusively allocated to the electronic vault 602. It will be appreciated, however, that the memory 603 may store other data or instructions, including but not limited to the token evolution engine 604.

FIG. 6 illustrates the validation network 700 of FIG. 1 which may store data usable for the user 101 to provide another source of proof to show that the possession token 200 is in actual possession of the user 101 (e.g., stored in the electronic vault 602 of the computing device 600), that the possession token 200 is associated with a public address 501 of the distributed ledger network 300, and/or additional data. In one or more embodiments where the possession token 200 is configured to evolve in state, the validation network 700 may store one or more instances of a state indicator 701 as may be received by the computing device 600 and/or the treasury server 400 and added to the ledger database 706 by a state entry module 710. The state entry module 710 comprises computer readable instructions that when executed on the processor 605 receives a state indicator 701 (e.g., a state hash 203) and creates an entry 708 of the state hash 203 in association with the token ID 201. The validation network 700 may also be two or more server computers (e.g., computing nodes 702.1 through 702.n) storing the ledger database 706 as a distributed database. The distributed database may be rendered eventually consistent through the consensus algorithm 714 running on each instance of the computing node 702, for example a byzantine fault tolerance and/or a raft algorithm. However, in one or more embodiments the ledger database 306 may stored as part of a public and/or "permissionless" distributed ledger network 300 (e.g., Ethereum, EOS). The consensus algorithm 714 may periodically and/or randomly select an instance of the computing node 702 to include the "correct" set of entries 708 and solidify the ledger database 706 in a data block of the ledger database 706 (which, for clarity, should be understood to be distinct from the data block 204 of the possession token 200 or the data block of the distributed ledger network 300). Depending on properties of the consensus algorithm 314, the reconciliation may occur according to a "block time," for example ten minutes, two minutes, ten seconds, or another timeframe.

Figure 7:
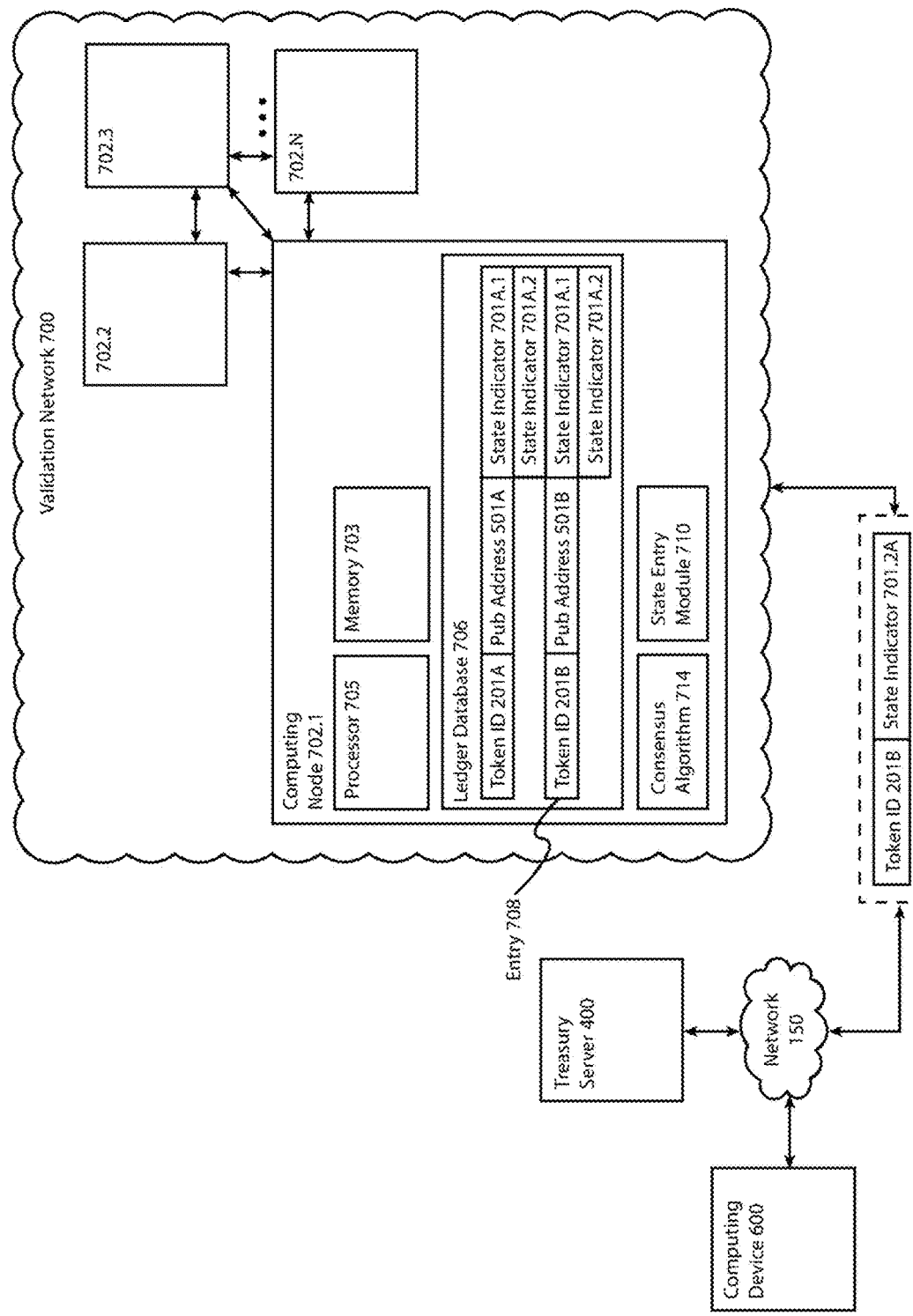
FIG. 7 illustrates a validation system which may provide independent evidence of ownership and/or possession token the possession token, including a ledger database comprising a token ID of the possession token, the public address of the possession token, and a state indicator, according to one or more embodiments.

The embodiment of FIG. 7 illustrates an implementation of the validation network 700 for an evolving instance of the possession token 200, wherein a ledger database 706 stores a set of states of the possession token 200 as a set of entries 708 in the ledger database 706, with the ledger database 706 distributed among the computer node 702.1 through the computing node 702.n. The ledger database 706 may be stored in a blockchain data structure, with each data block incorporating any new instances of the state indicator 701 from a set of transactions 160 of an associated instance of the possession token 200.

Each computing node 702 may be authenticated as a "permissioned" distributed network. Similarly, in one or more embodiments, each publisher of states (e.g., the computing device 600) may be authenticated and permissioned. In one or more embodiments, many users 101 may run an instance of the computing node 702.

In the embodiment of FIG. 7, the validation network 700 may receive a state indicator 701 associated with a possession token 200 (e.g., the state indicator 701 may be a block hash 206). For example, a possession token 200B may have been issued in an issue transaction 160.1 resulting in a state indicator 701B.1, and then subject to a present transfer transaction 160.2 resulting in generation of a state indicator 701B.2. Following the transfer transaction 160.2, the state indicator 701B.2 may be received by one instance of the computing node 702 (e.g., the computing node 702.1) from an electronic vault 602 and/or the treasury server 400. The state indicator 701B.1 may be stored in the ledger database 706 in association with the token ID 201 and/or the public address 501. Such storage as an entry 708 in the ledger database 706 may occur as a standard transaction periodically incorporated into a data block of a blockchain data structure. The computing node 702.1 may then propagate the entry 708 to the computing nodes 702.2 through computing nodes 702.n.

The validation network 700 may therefore provide an independent evidence of current possession of the possession token 200 (e.g., and therefore control and/or ownership of the ledger token 304), but ownership may still be determined by possession of the possession token 200 itself. In one or more embodiments the ledger database 306 includes no reference to the user ID 111 of a current possessor of the possession token 200, and therefore only stores state indicators 701 and/or evidence of state evolution usable to verify ownership.

Figure 8:
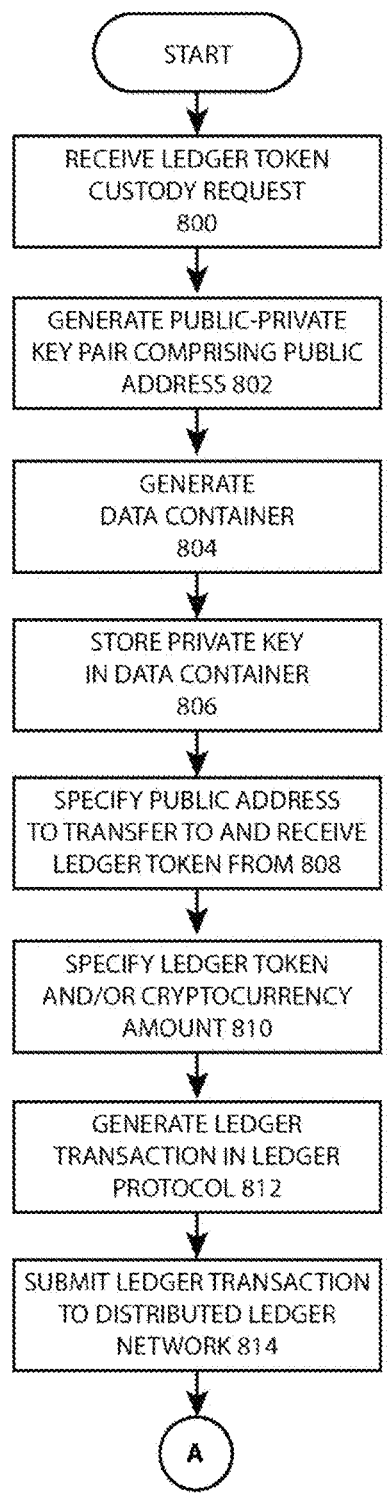
FIG. 8 is a custody initiation process flow illustrating a process for the transfer of a ledger token in response to a custody request, from a first instance of the public address (e.g., associated with a first private key stored in a wallet application), to a second instance of the public address (e.g., associated with a second private key securely stored in the custody server), according to one or more embodiments.

FIG. 8 is a custody initiation process flow 850 illustrating a process for the transfer of a ledger token 304 in response to a custody request from a first instance of the public address 301 (e.g., associated with a first private key 114 stored in a wallet application 102) to a second instance of the public address 501 (e.g., associated with a second private key 514 securely stored in the custody server 500), according to one or more embodiments. Operation 800 receives a custody request for a ledger token 304 of a distributed ledger network 300 (e.g., Bitcoin, Ethereum, Ripple, EOS). The ledger token 304 may comprise a quantity 318 of cryptocurrency. The custody request may be generated by an application on a computing device of the user 101, for example the computing device 100 and/or the computing device 600. The wallet application 102 may have a built-in function to generate the custody request.

Operation 802 generates a public-private key pair comprising a private key 514 and a public address 501. In one or more embodiments, operation 802 may be executed by the ledger key generation module 506 of the custody server 500 of FIG. 5. Operation 804 generates a data container 502. The data container 502 may be designated a set amount of the memory (e.g., the memory 503 of the custody server 500). In one or more embodiments, the data container 502 may be sandboxed to prevent interaction with other software of the computing device 600. The data container 502 may be stored as a data object with a unique identifier (e.g., the container ID 511) in a commercial database. Operation 806 stores the private key 514 in the data container 502. In one or more embodiments, multiple instance of the private key 514 (e.g., a private key 514A, a private key 514B, etc.) may be stored. In such case, the possession token 200 may represent a bundle of cryptocurrency and/or instances of the ledger token 504 (e.g., one BTC, one ETH, and one XRP).

Operation 808 specifies the public address 301 to transfer the ledger token 304 from and the public address 501 to transfer the ledger token 304 to in order to establish the custody. The public address 501 specified to receive the ledger token 304 may be received from the output of operation 802. Operation 810 specifies a ledger token 304 and/or a quantity 318 of cryptocurrency to be transferred to the public address 501 generated by the custody server 500. Operation 812 generates a ledger transaction 110 in a ledger protocol of the distributed ledger network 300. For example, a Bitcoin transaction may be generated in the Bitcoin application layer communication protocol defined on top of a TCP/IP network layer protocol. Operation 814 submits the ledger transaction 110 to the distributed ledger network 300 (e.g., a computing node 302 of the distributed ledger network 300). The process flow of FIG. 8 may be continued in the embodiment of FIG. 9.

Figure 9:
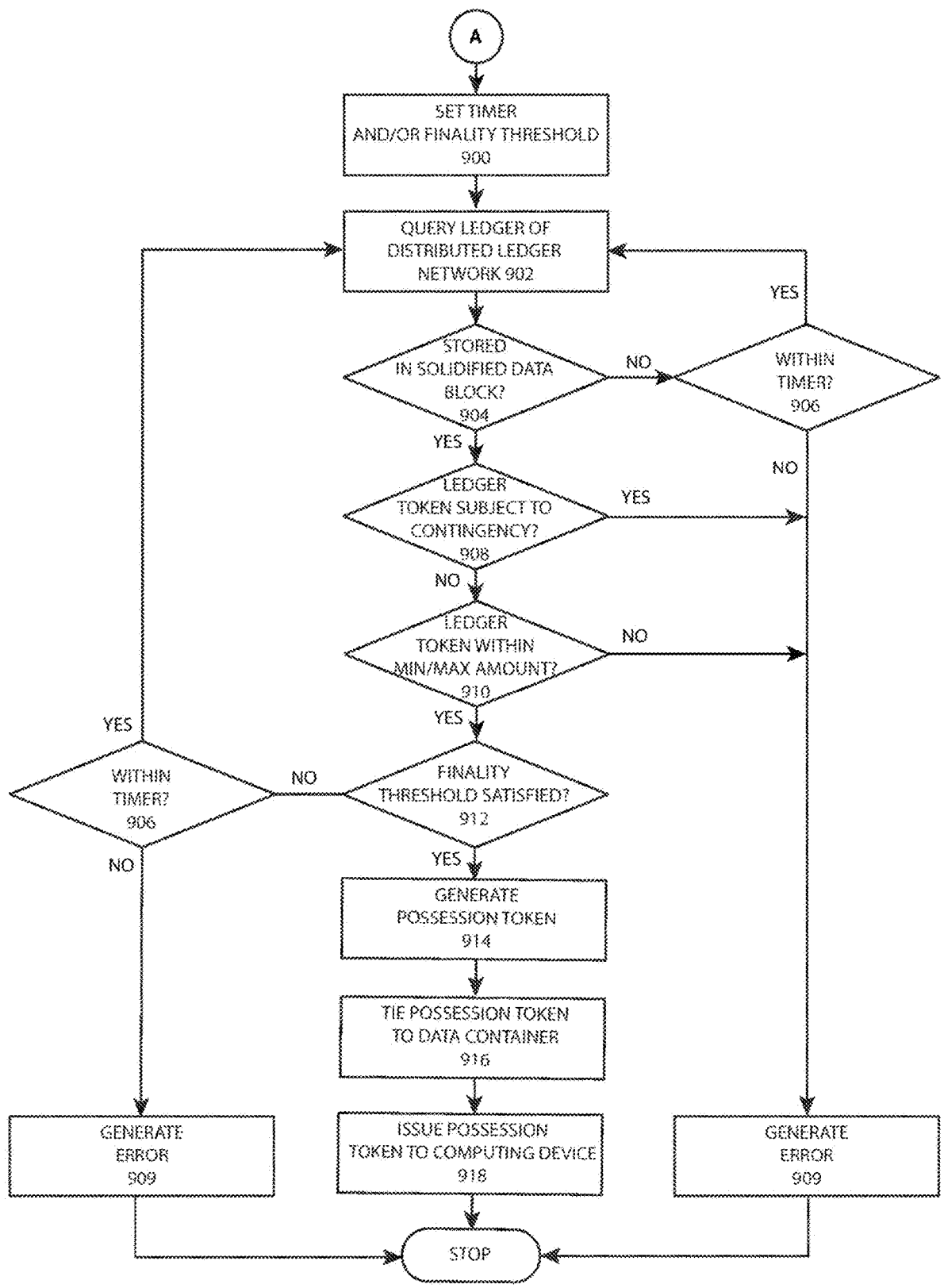
FIG. 9 is a custody verification and binding process flow illustrating verification of the transfer of the ledger token of FIG. 3 following the custody request of FIG. 8, association of the data container and/or the possession token with the ledger token, and issuance of the possession token to a computing device to complete the custody of the ledger token, according to one or more embodiments.

FIG. 9 is a custody verification and binding process flow 950 illustrating verification of the transfer of the ledger token 304 of FIG. 3, association of the data container 502 and/or the possession token 200, and issuance of the possession token 200 to a computing device 600 to complete the custody of the ledger token 304, according to one or more embodiments. Operation 900, which may commence following operation 814 of FIG. 8, may set a timer and/or a finality requirement. For example, the timer may be set for ten seconds, one minute, six hours, or one day. The timer may be set to a time generally recognized to be secure for the distributed ledger network 300. For example, within the Bitcoin network, a common time period for ensuring sufficient finality may be sixty minutes. Similarly, the finality requirement may be tied to a condition and/or event on the distributed ledger network 300, e.g., the solidification of six data blocks 308 in the ledger database 306 since the ledger transaction 110 associating the ledger token 304 with the public address 501 with the ledger token 304. Operation 902 queries the ledger database 306 of the distributed ledger network 300 to determine a status of the ledger token 304 was recorded. Operation 902 may query one or more instances of the computing node 302 or another source participating in the distributed ledger network 300 to examine and/or have returned data for determining sufficient transaction and/or settlement finality.

Operation 904 determines whether the ledger transaction 110 associating the ledger token 304 to the public address 501 is stored in a solidified instance of the data block 308. For example, such solidification may be determined to have occurred where an instance of the data block 308 that has been incorporated into the block chain data structure adopted by a majority of the nodes 302 of the distributed ledger network 300. A "majority" may be calculated by various methods depending on the consensus algorithm 314, for example computational power in the a case of a proof-of-work mechanism, or votes based on token ownership in the case of a proof-of-stake mechanism. If incorporation into a solidified instance of the data block 308 has not occurred, operation 904 may proceed to operation 906. Operation 906 determines whether the timer set in operation 900 has expired. If not, operation 906 may proceed back to operation 902. If expiration of the timer has occurred, operation 906 proceeds to generate an error in operation 909 that may be communicated to one or more servers, the computing device 100, the computing device 600, and/or otherwise to the user 101. Where the ledger transaction 110 has been solidified in a data block 308, operation 904 proceeds to operation 908.

Operation 908 determines whether the ledger token 304 is subject to a contingency. Specifically, in one or more embodiments, operation 908 determines the ledger token 304 and the cryptographic currency of the ledger token 304 is not subject to a contingency of a self-executing contract of the distributed ledger network 300. In one or more embodiments, the ledger token 304 may comprise a self-executing contract 310 and/or be subject to control of a self-executing contract 310 with the possibility to automatically distribute value (e.g., a portion or all of the quantity 318 of cryptocurrency) and/or engage in additional transactions. In another example, the ledger token 304 may be subject to joint control by one or more instances of a private key (such that the private key 514 is not the exclusive private key controlling the public address 501). If any contingency is detected, operation 908 may proceed to operation 909 (and/or, in one or more embodiments, to operation 906). Otherwise, operation 908 proceeds to operation 910. Operation 910 determines whether the quantity 318 is within a minimum quantity and/or a maximum quantity that may be specified. In one or more embodiments, each possession token 200 issued in association with a custodied instance of the ledger token 304 may represent a fixed value, e.g., 5 BTC per possession token 200. Similarly, operation 910 may check to make sure an instance of the ledger token 304 that represents an asset is actually associated with the asset, a process which may be effected by accessing an external database and/or API. If not within the minimum amount and/or the maximum amount that may be specified, operation 910 may proceed to operation 909. However, if within the minimum amount and/or the maximum amount, operation 910 proceeds to operation 912.

Operation 912 determines whether the finality threshold of operation 900 has been satisfied. For example, a certain instance of the computing node 302 may have to adopt the ledger transaction 110 associating the ledger token 304 with the public address 501, and/or the computing node 302 running a full instance of the ledger database 306 (e.g., comprising an entire history of ledger transactions and all instances of ledger tokens 304 of the distributed ledger network 300) must store the ledger transaction 110 associating the ledger token 304 with the public address 501 in at least the sixth data block 308.$n$–6 beneath a current instance of the data block 308.$n$. Where the finality requirement is not satisfied, operation 912 proceeds to operation 902 or, in one or more embodiments, operation 906. Where the finality requirement is satisfied, operation 912 proceeds to operation 914.

Figure 13:
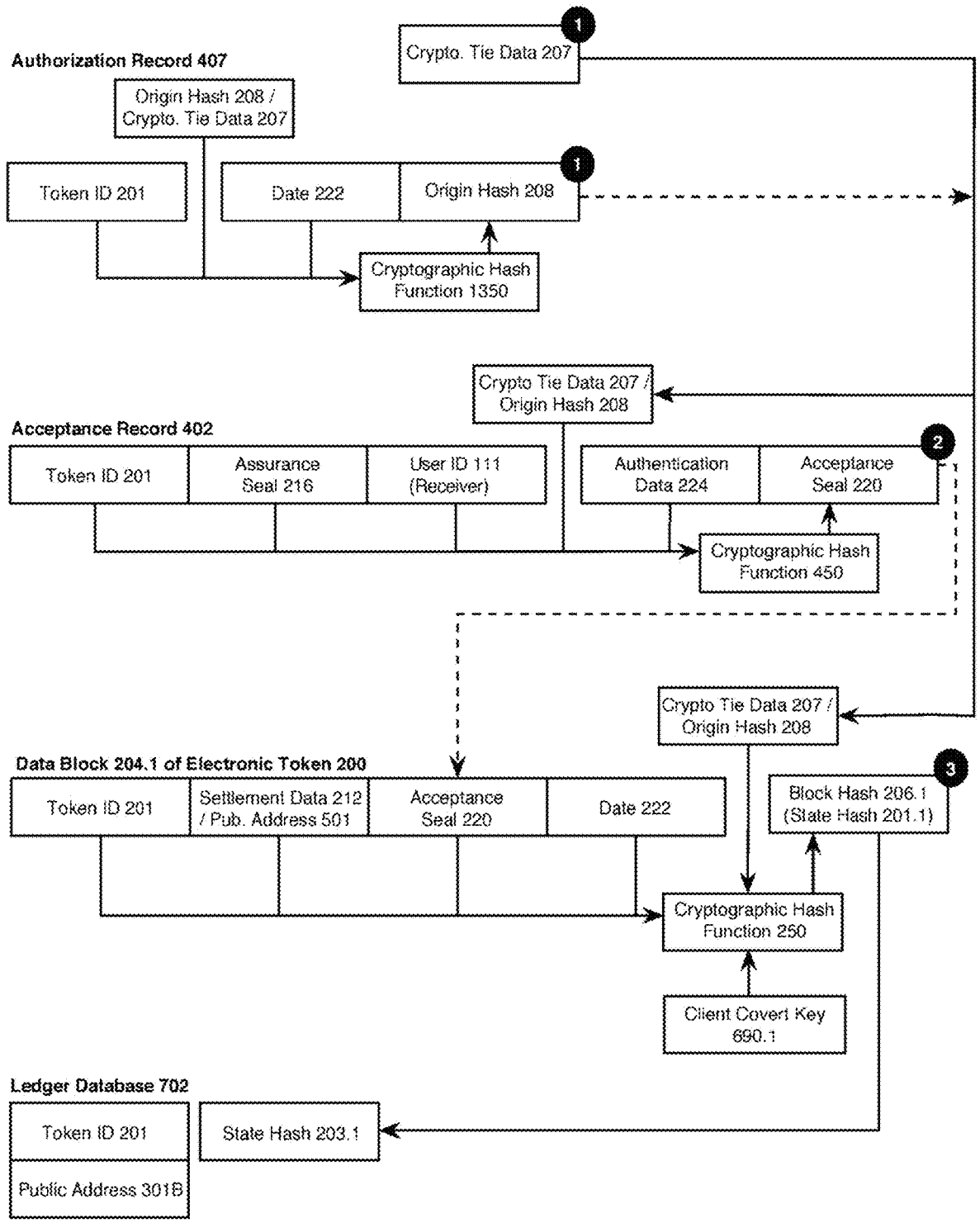
FIG. 13 illustrates an issue transaction of the possession token of FIG. 2 after being bound to a ledger token, including illustrating a cryptographic tie data, a cryptographic hash function, and a state hash as an instance of the state indicator, according to one or more embodiments.

Operation 914 generates the possession token 200 and prepares the possession token 200 for issuance to the electronic vault 602 of the user 101. The detailed process and potential data for inclusion in the issue transaction 160.1 is shown and described in conjunction with the embodiment of FIG. 13. Operation 916 ties the possession token to the data container 502. In one or more embodiments, the tie may be a reference from the data container to the token ID 201 that may be stored in the possession token 200 and/or a reference from the possession token 200 to the data container 502. However, in one or more other embodiments, data may establish a cryptographic tie between the possession token 200 and the public address 501. For example, the public address 501 and/or the container ID 511 may be incorporated into a first instance of a state indicator 701.1 of the possession token 200. One example embodiment that may be used to establish the cryptographic tie is illustrated in conjunction with the embodiment of FIG. 13. Operation 918 issues the possession token 200 to the computing device 600 of the user 101. The issuance of the possession token 200 is also illustrated in the embodiment of FIG. 13.

FIG. 10 is a possession token key exchange process flow 1050 illustrating a method by which the private key 514 can be encrypted with a shared secret generated between a server computer (e.g., the shared secret 594) and a client computing device (e.g., the shared secret 694), a client covert key 690 of the shared secret also usable to evolve a state indicator 701 of the possession token 200 (e.g., the possession token

200 of FIG. 2), according to one or more embodiments. Operation 1000 transfers the possession token 200 to a computing device 600 over a network 150. Operation 1002 generates a public-private key pair comprising a client overt key 692 and a client covert key 690. Operation 1002 may be effected by, for example, possession key generation engine 608. Operation 1004 generates a public-private key pair comprising a server overt key 592 and a server covert key 590. Operation 1004 may be effected by, for example, possession key generation module 512.

Operation 1006 transmits the client overt key 692 from the computing device 600 to a server (e.g., the custody server 500) and optionally transmits the server overt key 592 from the server to the computing device 600. Operation 1008 generates a shared secret 594 from the server covert key 590 and the client overt key 692. Operation 1010 generates a shared secret 694 from the client covert key 690 and the server overt key 592. Where the possession token 200 comprises a blockchain data structure, Operation 1012 adds a data block 204 to the blockchain data structure of the possession token 200 upon receipt by the computing device 100, and evolves a state indicator 701 of the possession token 200.

Operation 1014 optionally deletes the shared secret 594 and/or the server covert key 590. Operation 1016 utilizes the client covert key 690 solely on the computing device 600 to evolve the state of the possession token 200. Operation 1018 transmits the state indicator 701 to a validation network 700 to store an independent proof of receipt of the possession token 200 by the electronic vault 602 and/or the computing device 600.

Figure 11:
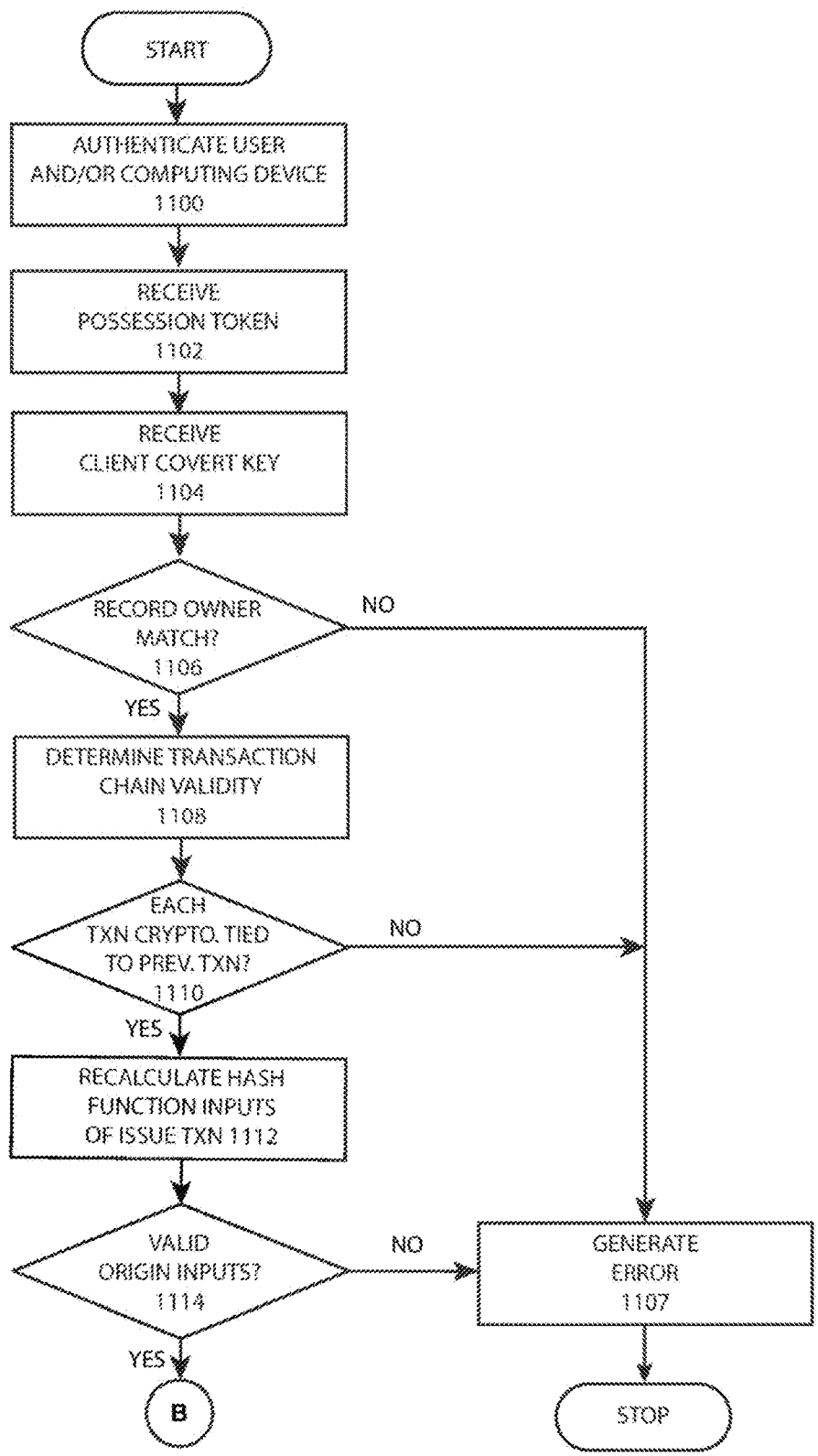
FIG. 11 is a possession token validation process flow illustrating validation and/or verification of the possession, including authenticating a user and determining a match of a record owner, a cryptographic tie between each block of the possession token and each previous block of the possession token terminating in a valid origin hash, according to one or more embodiments. The process flow of FIG. 11 may be continued in the embodiment of FIG. 12.

FIG. 11 is a possession token validation process flow 1150 illustrating validation and/or verification of the possession token 200 of FIG. 2, including authenticating a user 101 (e.g., through the computing device 600) and determining a match of a record owner, where a cryptographic tie between each data block 204 of the possession token 200 and each previous data block 204 of the possession token 200 terminating in a valid origin hash 208, according to one or more embodiments. The process flow of FIG. 11 may continue in the process flow of FIG. 12. Operation 1100 authenticates a user 101 and/or the computing device 600 of a first user 101. Multiple authentication factors may be utilized, for example a first factor (e.g., a password), second factor (e.g., a device or fob), and third factor (e.g., biometric). Operation 1102 receives over the network 150 a possession token 200 that the first user 101 is instructing to transfer into possession of a second user 101. Operation 1104 receives a client covert key 690 over the network 150. The client covert key 690 may be received along with the possession token 200, or may be received through a separate and/or an out-of-band communication channel. Operation 1106 determines if the user 101 authenticated in operation 1100 is a record owner of the possession token 200. In one or more embodiments, the record owner may be determined by referencing an acceptance record 404 where a user ID 111 of a recipient user 101 of who last received the possession token 200 may be stored. Where the record owner does not match, operation 1107 may optionally generate an error and/or reject the proposed instance of the transfer transaction 160.

Operation 1108 determines a transaction chain validity of the possession token 200. For example, in the embodiment of FIG. 2, starting with the latest state hash 203.3, each previous instance of the block hash 203 may be generated until reaching the block hash 206.1. Operation 1110 determines whether each transaction (e.g., the transfer transaction 160.2 through transfer transaction 160.n) is cryptographically tied to each previous transaction 160. Operation 1112 recalculates hash function inputs of the block hash 206.1 of the issue transaction 160.1 to determine if the issue transaction 160.1 is valid and/or tied to the data container 502. For example, the cryptographic tie data 207, such as the public address 501 and/or the data container ID 511, may be input into the cryptographic hash function 250 along with the data block 204.1 to result compared to the block hash 206.1 stored in the data block 204.2. Where no match occurs, operation 1114 proceeds to operation 1107. Where a match occurs, the cryptographic chain may have been established back to the ledger token 304 and operation 1114 may proceed to operation 1200 of FIG. 12. Operation 1107, after generating an error, may terminate.

Figure 12:
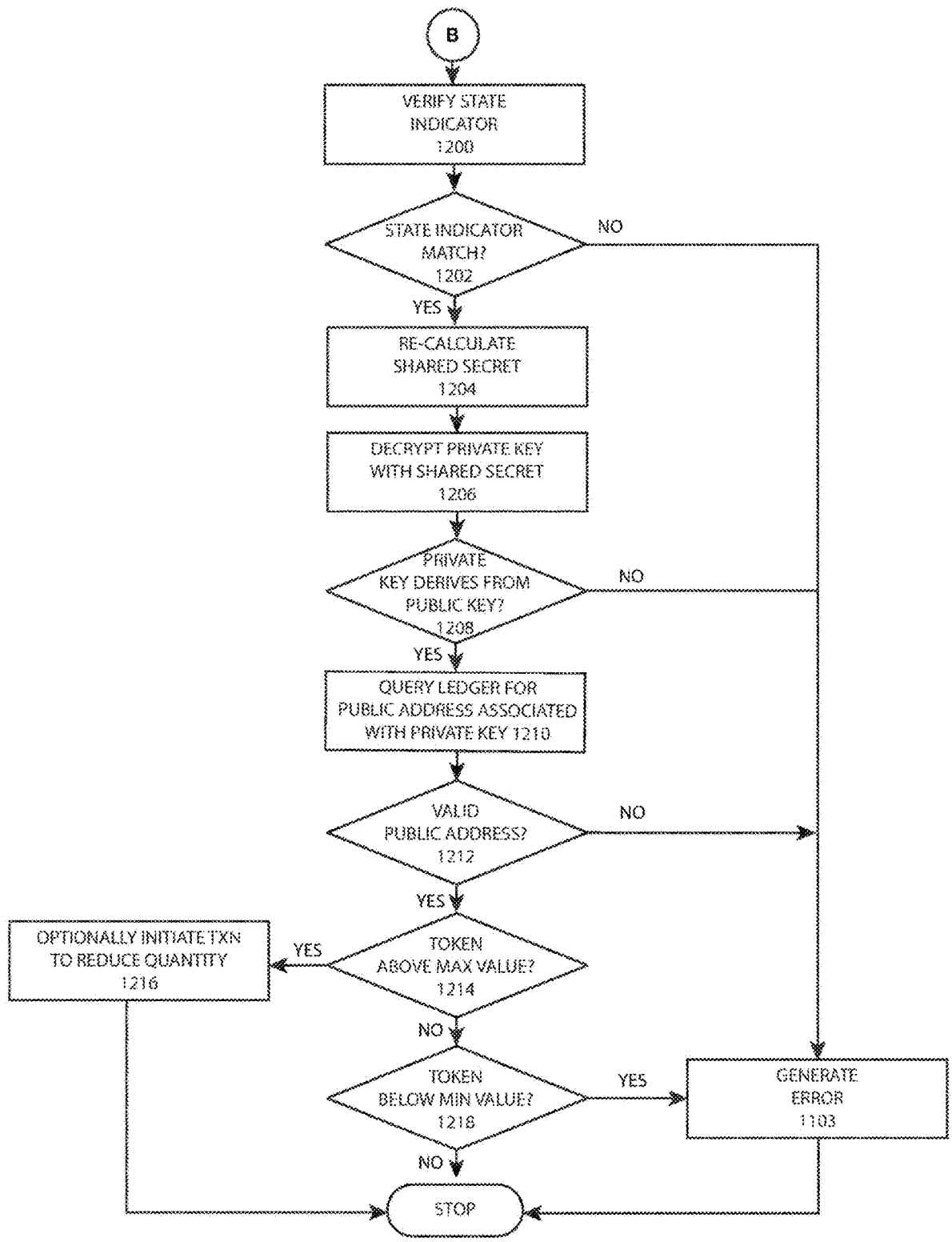
FIG. 12 illustrates a token validation process flow that may continue from FIG. 11, including determining validity of a state indicator of the possession token, that the private key derives from the public address, and that a quantity of cryptocurrency associated with the ledger token matches a record amount, according to one or more embodiments.

FIG. 12 illustrates a token validation process flow 1250 that may continue from FIG. 11, including determining validity of a state indicator 701 of the possession token 200, that the private key 514 derives from the public address 501, and/or that an amount of cryptocurrency (e.g., the quantity 318) associated with the public address 501 matches a record quantity 117, according to one or more embodiments. Operation 1200 verifies a state indicator 701 of the possession token 200 is valid, e.g., by determining that the instance the computing device 600 transferring the possession token 200 was the last instance of the computing device 100 to update the state indicator 701. The state indicator 701 is data that provides evidence that the possession token 200 changed in state upon occurrence of an event, for example the issue transaction 160.1, a transfer transaction 160.2, temporary storage in the settlement vault 402, and/or other types of events. In one or more embodiments, the state indicator 701 may be a state hash 203 that is the output of a cryptographic hash function. Specifically, referring to the embodiment of FIG. 2, the state hash 203 may be a block hash 206 where the possession token 200 adds a new instance of the data block 204 after each transfer between instances of the electronic vault 602. The block hash 206.3 may be the output of the cryptographic hash function 250, with inputs comprising the data block 204.3, a previous block hash (e.g., the block hash 206.2), and a client covert key 690.3. In one or more embodiments, operation 1200 verifies the state indicator 701 by receiving the client covert key 690 from the computing device 600 and inputting the client covert key 690, along with all other data previously input into the cryptographic hash function 250, to verify the output matches the state indicator 701 (e.g., which may be the block hash 206.3).

Operation 1202 determines whether the state indicator 701 received as data from the computing device 600 and/or calculated from data received from the computing device 600 matches a last recorded instance of the state indicator 701. If not, operation 1202 proceeds to operation 1203 which generates an error, then terminates. However, where a match is determined, operation 1202 proceeds to operation 1204. Operation 1204 recalculates the shared secret 594, e.g., by utilizing the client covert key 690 and the server overt key 592. Operation 1206 decrypts the private key 514 in such case that the private key 514 was encrypted with the shared secret 594.

Operation 1208 determines whether the private key 514 derives from the public address 501. This may be accomplished, for example, through a standard library as utilized by many instances of the wallet application 102. If the private key 514 does not derive from the public address 501, operation 1208 proceeds to operation 1203. However, where the private key 514 is determined to properly derive from the public address 301B, operation 1208 proceeds to operation

1210. Operation 1210 queries the ledger database 306 (e.g., queries an instance of the node 302 storing a copy of the ledger database 306) for the public address 103B associated with the private key 514. If no instance of the public address 103B is determined to exist, operation 1212 proceeds to operation 1203. Where the public address 103B is returned as valid from the query, operation 1214 determines whether a ledger quantity of the ledger token 304 matches the record quantity 117. Where the record ledger token 304 is below the record quantity 117, an error can be generated. A positive determination of operation 1218 may, in some cased, be unusual, but may occur where, for example, a self-executing contract 310 associated with the ledger token 304 included a flaw, was hacked, or was permission to be bound to a possession token 200 even when subject to a contingency of a smart contract. Where the ledger balance is greater than record amount 117, operation 1214 may proceed to operation 1216, which may generated and submit a ledger transaction (e.g., a ledger transaction 110) to reduce ledger balance to the record quantity 117. This may be useful, for example, where cryptocurrency is anonymously or impermissibly sent over the distributed ledger network 300 and attachment to the public address 501 may pose problematic for regulatory purposes (e.g., anti-money laundering requirements of the organization that may be operating the treasury server 400 and/or the custody server 500).

FIG. 13 illustrates an issue transaction 160.1 of the possession token 200 of FIG. 2 any one method of binding to a ledger token 304, including illustrating a cryptographic tie data 207, a cryptographic hash function (e.g., the cryptographic hash function 1350, the cryptographic hash function 250), and a state hash 203 as an instance of the state indicator 701, according to one or more embodiments.

Initially, in one or more embodiments, the custody server 500 may verify receipt of the ledger token 304 (e.g., association of the ledger token 304 to the public address 501 beyond a threshold certainty as shown and described in the embodiment of FIG. 8). The custody server 500 may generate an assurance seal 216 that specifies transactions details such as the date, time, and other transaction data of the issue transaction 160.1. The custody server 500 may transmit the assurance seal 216 to the treasury server 400 for incorporation into an acceptance record 404 associated with the possession token 200 issuing to the user 101.

In one or more embodiments, the user 101 may also pay other value (e.g., cash, cryptocurrency, a physical asset such as gold, stock) in exchange for issuance of the possession token 200. The user 101 may not own the computing device 100 or have access to the wallet application 102, but rather submit payment or other consideration to the owner and/or operator of the computing device 100 (e.g., operating as an exchange), such that the owner and/or operator transfers value from the public address 301 to the public address 501. Data from this transaction may also be included within the assurance seal 216, in one or more embodiments.

In the embodiment of FIG. 13, an instance of the possession token 200 is initiated using an origin hash 208. However, as shown, the cryptographic tie data 207 may also be utilized as the initiating value. The origin hash 208 may be formed through a variety of ways, for example as the output of the cryptographic hash function 1350 inputting a token ID 201 (that may be a GUID of 32 characters), and a date 222 of authorization of the possession token 200. The inputs may be stored in the authorization record 407.

In the embodiment of FIG. 13, an instance of the acceptance record 404 is illustrated. The acceptance record 404 may be stored in a standard database (e.g., as entries in a relational database, an object in a NoSQL database), or itself be stored in a blockchain data structure and/or utilizing a hash tree data structure. The assurance seal 216 may be a hash (e.g., a cryptographic hash function output) of data specifying the ledger token 304 that the possession token 200 is bound to, for example the public address 501 and/or the settlement data 212. The user ID 111 may be the user 101 who will be in possession of the possession token 200 immediately following the issue transaction 160.1. An acceptance seal 220 can be generated which can be included in the transaction data 204.1 of the possession token 200 for auditing purposes so that data block 206.1 can be tied to data and a specific entry in the acceptance record 404. In the embodiment of FIG. 11, the token Id 201, the settlement data 212 and/or the public address 501, the acceptance seal 220, the date 222 of the issue transaction 160.1 is included in the transaction data 202. Along with the cryptographic tie data 207 or the origin hash 208 and the client covert key 690.1, the transaction data is input into the cryptographic hash function 250 to output the block hash 206.1 representing an evolved state of the possession token 200 following the issue transaction 160.1. The block hash 206.1 is published as the state hash 203.1 to the validation network 700 where it may be stored in association with the token Id 201 of the possession token 200. The block hash 206.1 may be the state indicator 701.1.

FIG. 14 illustrates a transfer transaction (e.g., a transfer transaction 160.2 through a transfer transaction 160.N) between users (e.g., a user 101A and a user 101B) that may securely change ownership of the ledger token 304 without changing the custodian (e.g., an operator of the custody server 500), without exposing the private key 514 or initiating a ledger transaction 110 of the distributed ledger network 300, according to one or more embodiments. Specifically, the embodiment of FIG. 14 illustrates the possession token of FIG. 13 after 'N' transactions. The acceptance record 404 may include both a user ID 111 of a user 101A sending the possession token 200, and a user ID 111 of a user 101B receiving possession of the possession token 200. The block hash 206.N is the output of a cryptographic hash function 250 with inputs comprising the block hash 206.N–1, forming a dependency 210 as shown and described in conjunction with the embodiments of FIG. 2. The disclosure record 406 may include each client covert key 690.N turned in (e.g., to the treasury server 400) to verify and complete transactions 160.2 though 160.N, and the ledger database 706 may now store a set of state hashes 203.1 through 203.N as instances of the state indicator 701.

Figure 15:
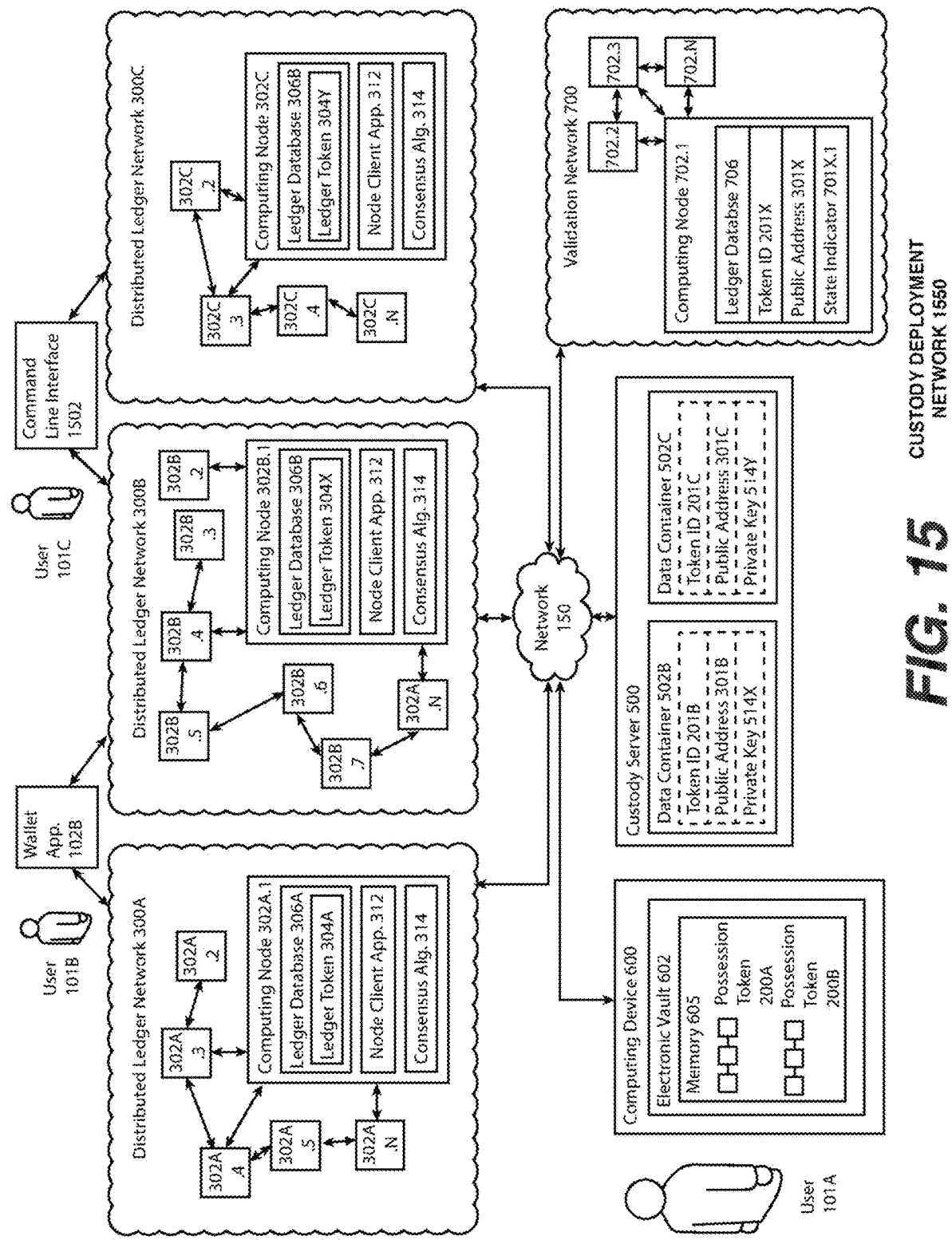
FIG. 15 illustrates is a custody service deployment network 1550 illustrating a technology an organization may utilize to effectively provide the service of secure custody of ledger tokens across multiple instances of the distributed ledger network, including a forked instance of the distributed ledger network, according to one or more embodiments.

FIG. 15 is a custody service deployment network 1550 illustrating a technology an organization may utilize to effectively provide the service of secure custody of ledger tokens 304 across multiple instances of the distributed ledger network 300, including a distributed ledger network 300A and a forked instance of the distributed ledger network 300B that resulted in the distributed ledger network 300C, according to one or more embodiments. Illustrated in the embodiment of FIG. 15, several instances of the user 101 may own ledger tokens 304 across several distributed ledger networks 300. For example, the distributed ledger network 300A may be the Bitcoin network, the distributed ledger network 300B may be the Ethereum network, and the distributed ledger network 300C may be the Ethereum Classic network, although many other examples are possible. The user 101B may own ledger tokens 304 on the distributed ledger network 300A through the wallet application 102 and the user 101C may own ledger tokens 304 acquired through the command line interface 1502.

The user 101C may require significant technical ability to utilize the command line interface 1502, and may have to come up with a separate system and/or utilize a separate application for storing instances of the private key 114. The user 101B may be susceptible to wallet hacks and/or losing their computing device 100. Although not shown in the embodiment of FIG. 15, the ledger token 304 may have to be re-keyed, e.g., transferred between a first public address 301.1 associated with private key 114.1 stored on the wallet application 102B to a second public address 301.2 associated with a private key 114.2 generated by the user 1502. Through careful management of his or her public association with the public address 301, the user 101B may be able to hide his or her identity which may be impermissible under government regulations if the ledger token 304 (which may comprise cryptocurrency) is to be utilized in certain regulated industries. Similarly, additional cryptocurrency may be attached to the public key 301.1 without the consent of the user 101B from a public key 301.3 with an anonymous owner or controller. It may also be difficult to exchange a first type of ledger token (e.g., the ledger token 304A) for a second ledger token 304.B) without going through a cryptocurrency exchange (also not shown in the embodiment of FIG. 15).

In contrast, the user 101A may have an owned ledger tokens 304 controlled through a custodian, the ledger token 304 attached to an instance of the public address 501 associated with an instance of the private key 514 held in the custody server 500. For example, the possession token 200A may be tied to the ledger token 304A and issued to the electronic vault 602 of the user 101A, with an optional independent evidence of possession of the possession token 200A transmitted to the validation network 700. Similarly, the possession token 200B may be tied to the ledger token 304B and issued to the electronic vault 602 of the user 101A, with an optional independent evidence of possession of the possession token 200B transmitted to the validation network 700. In one or more embodiments, the electronic vault 602 may store instances of a first instance of the possession token 200 that is associated with the ledger token 304A and a second instance of the possession token 200B that is associated with the ledger token 304B.

In one or more embodiments, at a first time, a distributed ledger network 300B may not yet have forked into the distributed ledger network 300B and the distributed ledger network 300C. The possession token 200B may be associated with a ledger token 304B prior to the fork. Upon occurrence of the fork, the treasury server 400 and/or the custody server 500 may halt transfer of the possession token 200B between electronic vaults 602 until a threshold certainty about the outcome of the fork has occurred (e.g., both forking instances of the distributed ledger network 300B have survived with a satisfactory number of nodes 302). The user 101A may optionally transfer and/or submit the possession token 200 to the treasury server 400 which may then decrypt the private key 514 and initiate a ledger transaction 110 to re-key the ledger token 304B from the public address 501B to a public address 501X on the distributed ledger network 300B and/or re-key the ledger token 304B from the public address 501B to a public address 501Y on the distributed ledger network 300C. The user 101A may then be issued two instances of the possession token 200, e.g., a possession token 200X and a possession token 200Y, each bound to the public address 301X and the public address 301Y. There may be a single validation network for possession tokens 200 associated with all instances of the distributed ledger network 300, or each distributed ledger network 300 (e.g., 300A, 300B, and 300C) may have its own instance of the validation network 700.

In one or more embodiments, the fork in the distributed ledger network 300 may be addressed through an automatic re-keying process of the custody server 500 and/or the treasury server 400. A first process may determine a database fork in the ledger database 306 of the distributed ledger network 300 persists based on a time (e.g., an amount of time the fork has persisted), a number of data blocks 308 since the fork initiated, and a composition of voting power of the nodes 302 of the distributed ledger network 300 based on the consensus algorithm 314. The fork may result in a first fork of the distributed ledger network 300 (e.g., the distributed ledger network 300B of FIG. 15) and a second fork of the distributed ledger network 300 (e.g., the distributed ledger network 300C of FIG. 15). A second process may generate a first public-private key pair and a second public-private key pair. A third process may duplicate the data container 502 in memory (e.g., the memory 503) to result in a first data container 502B and a second data container 502C. A fourth process may initiate a re-key transaction (e.g., which may be an instance of the ledger transaction 110) on the first fork. The re-key transaction transfers the ledger token 304 of the first fork to a public address 301B of the first public-private key pair. A fifth process may then initiate a re-key transaction on the second fork, the re-key transaction to transfer the ledger token 304 of the first fork to a public address 301C of the fourth public-private key pair. A sixth process may store the private key 514B of the first public-private key pair in the first data container 502B and store the private key 514C of a second public-private key pair in the second data container 502C. This process may be initiated, for example, the first time the user 101 transfers the possession token 200 following the fork. It may also occur without receiving the possession token 200 if the private key 514 is unencrypted. As a result of such a re-keying, which may occur substantially simultaneously, the use may have ensured that the ledger token 304 is not controlled by the same private key 514 across multiple instances of the distributed ledger network 300. This may help lower the risk of brute force attacks, and also limit certain hacks related to forks such as a replay attack.

In one or more embodiments, a ledger transaction 110 (e.g., a re-key transaction, a redemption transaction) may be queued and automatically executed by the custody server 500. A first operation may generate and queue the ledger transaction of the distributed ledger network 300 (e.g., on the custody server 500). A second operation may query a transaction fee of the distributed ledger network 300. A third operation may determine that the transaction fee is below a threshold value. For example, where the average transaction fee is below 0.001 BTC. In one or more embodiments, a ruleset may be applied to determine whether it is probably the ledger transaction 110 will make it into the data block 308.n based on current transactions pending in the data block 308.n of the node 302. A fourth operation initiates the ledger transaction 110 on the distributed ledger network 300.

Although the present embodiments have been described with reference to specific example embodiments, it will be evident that various modifications and changes may be made to these embodiments without departing from the broader spirit and scope of the various embodiments. For example, the various devices, servers and engines described herein may be enabled and operated using hardware circuitry (e.g., CMOS based logic circuitry), firmware, software or any combination of hardware, firmware, and software (e.g., embodied in a non-transitory machine-readable medium).

For example, the various electrical structure and methods may be embodied using transistors, logic gates, and electrical circuits (e.g., application specific integrated (ASIC) circuitry and/or Digital Signal Processor (DSP) circuitry).

Each of the computing devices and servers (e.g., the computing device 100, the node 302, treasury server 400, the custody server 500, the computing device 600, the computing node 702) may have on or more sources of entropy in which to generated a nonce and other inputs that may be required for cryptography.

In addition, it will be appreciated that the various operations, processes and methods disclosed herein may be embodied in a non-transitory machine-readable medium and/or a machine-accessible medium compatible with a data processing system (e.g., the computing device 100, the node 302, treasury server 400, the custody server 500, the computing device 600, the computing node 702). Accordingly, the specification and drawings are to be regarded in an illustrative rather than a restrictive sense.

The structures and engines in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

We claim:

1. A method for rapid and secure ledger-less transfer of a ledger token, the method comprising:
generating a first public-private key pair comprising a public key usable as a public address of the ledger token of a distributed ledger network and a private key usable to transfer the ledger token of the distributed ledger network from the public address to a different public address;
verifying that a ledger transaction occurred on the distributed ledger network at least one of (i) associated an asset with the public address, and (ii) transferred the asset to the public address;
generating a possession token storable in physical memory and having a state of the possession token indicated by a state indicator,
wherein the state of the possession token evolves upon transfer between two computing devices over a network;
cryptographically associating the ledger token and the possession token through incorporation of the public address into data generating the state indicator of the state of the possession token;
encrypting the private key to form an encrypted private key; and
storing the encrypted private key in the possession token.

2. The method of claim 1, further comprising:
adding a block to a blockchain data structure of the possession token upon receipt of the possession token by a first computing device; and
evolving the state indicator of the possession token.

3. The method of claim 2, further comprising:
transmitting the state indicator to a validation network to store an independent proof of receipt of the possession token by the first computing device.

4. The method of claim 3, further comprising:
transmitting the public address to the first computing device over an encrypted communication channel;
generating a second public-private key pair comprising a client overt key and a client covert key;
utilizing the client covert key solely on the first computing device to evolve the state of the possession token;
transmitting the client overt key from the first computing device to a server;
generating a third public-private key pair comprising a server overt key and a server covert key;
transmitting the client overt key from the server to the first computing device;
generating a shared secret from the server covert key and the client overt key; and
wherein the private key is encrypted with the shared secret.

5. The method of claim 4, further comprising:
receiving the possession token over the network;
receiving the client covert key over the network;
re-calculating the shared secret from the client covert key and the server overt key;
determining at least one of the first computing device and a user associated with the first computing device is a record owner of the possession token;
determining that each transaction in a blockchain data structure of the possession token is cryptographically associated with each previous transaction of the possession token terminating in an origin hash; and
recalculating the origin hash utilizing a set of inputs to a cryptographic hash function outputting the origin hash.

6. The method of claim 5, further comprising:
decrypting the private key stored in the possession token with the shared secret recalculated from the client covert key and the server overt key;
reading the public address of the ledger token associated with the possession token;
determining the public key exists in a ledger database of the distributed ledger network;
extracting the private key from the possession token;
determining that the private key is associated with the public key to form the first public-private key pair; and
verifying at least one of the ledger token specified in the possession token matches the ledger token as queried from the distributed ledger network.

7. The method of claim 6, further comprising:
inputting the public address as part of an origin data of the possession token to generate the origin hash of the possession token necessarily dependent on the public address;
receiving the client overt key of a second computing device associated with the client covert key of the second computing device used to evolve the state of the possession token;
generating a second instance of the shared secret utilizing the client overt key of the second computing device and the server covert key;
re-encrypting the private key stored in the possession token with the second instance of the shared secret; and
deleting the client overt key of the second computing device.

8. A method for transacting in a custodied ledger token associated with an asset, the method comprising:

generating a first public-private key pair comprising a public key usable as a public address of a ledger token of a distributed ledger network associated and a private key usable to transfer the ledger token of the distributed ledger network from the public address to a different public address;

verifying a ledger transaction occurring on the distributed ledger network meets a finality requirement based on a consensus algorithm of the distributed ledger network, the finality requirement with respect to at least one of (i) transferring the asset to the public address and (ii) associating the asset with the public address;

generating a possession token storable in a memory and having a state of the possession token indicated by a state indicator that evolves upon a transfer between two instances of computing devices,
  wherein the state indicator is a state hash that is a hash value dependent on a transaction data associated with the transfer between the two instances of computing devices;

storing the private key usable to transfer the ledger token of the distributed ledger network from the public address to the different public address; and transferring the possession token to a first computing device over a network.

9. The method of claim 8, further comprising:

generating a second public-private key pair comprising a client overt key and a client covert key;

utilizing the client covert key solely on the first computing device to evolve the state of the possession token; and transmitting the client overt key from the first computing device to a server.

10. The method of claim 9, further comprising:

generating third public-private key pair comprising a server overt key and a server covert key;

transmitting the client overt key from the server to the first computing device; and generating a shared secret from the server covert key and the client overt key.

11. The method of claim 10, further comprising:

encrypting the private key within the possession token with the shared secret.

12. The method of claim 11, further comprising:

authenticating the first computing device; and determining at least one of the first computing device and a user associated with the first computing device is a record owner of the possession token.

13. The method of claim 12, further comprising:

receiving the possession token over the network;

receiving the client covert key over the network;

re-calculating the shared secret from the client covert key and the server overt key;

determining that each transaction in a blockchain data structure of the possession token is cryptographically associated with each previous transaction of the possession token terminating in an origin hash; and recalculating the origin hash utilizing a set of inputs to a cryptographic hash function outputting the origin hash.

14. The method of claim 13, further comprising:

decrypting the private key stored in the possession token with the shared secret recalculated from the client covert key and the server overt key;

reading the public address of the ledger token associated with the possession token;

determining the public key exists in a ledger database of the distributed ledger network;

extracting the private key from the possession token;

determining that the private key is associated with the public key to form the first public-private key pair;

verifying at least one of the ledger token specified in the possession token matches the ledger token as queried from the distributed ledger network;

transmitting the possession token to a second computing device;

receiving the client overt key of the second computing device associated with the client covert key of the second computing device used to evolve the state of the possession token;

generating a second instance of the shared secret utilizing the client overt key of the second computing device and the server covert key;

re-encrypting the private key stored in the possession token with the second instance of the shared secret;

deleting the client overt key of the second computing device;

inputting the public address as part of an origin data of the possession token to generate the origin hash of the possession token necessarily dependent on the public address;

adding a block to the blockchain data structure of the possession token upon receipt by the first computing device and evolving the state indicator of the possession token; and transmitting the state indicator to a validation network to store an independent proof of receipt of the possession token by the first computing device.

15. The method of claim 14, further comprising:

determining a database fork in the ledger database of the distributed ledger network persists based on at least one of a time, a number of data blocks, and a composition of voting power of a set of computing nodes of the distributed ledger network based on the consensus algorithm, the database fork resulting in a first fork of the distributed ledger network and a second fork of the distributed ledger network;

generating a third public-private key pair and a fourth public-private key pair;

generating a first data container and a second data container;

initiating a re-key transaction on the first fork, the re-key transaction on the first fork to transfer the ledger token of the first fork to a public address of the third public-private key pair;

initiating a re-key transaction on the second fork, the re-key transaction on the second fork to transfer the ledger token of the first fork to a public address of the fourth public-private key pair;

storing the private key of the third public-private key pair in the first data container;

storing the private key of a fourth-public-private key pair in the second data container;

transmitting the public key usable as the public address to a wallet application;

queuing the ledger transaction on the distributed ledger network;

querying a transaction fee of the distributed ledger network;

determining the transaction fee is below a threshold value;

initiating the ledger transaction on the distributed ledger network;

determining at least the ledger token is not subject to a contingency of a self-executing contract of the distributed ledger network;

inputting the client covert key into the cryptographic hash function to output a second hash value used as the state indicator; and
   wherein the re-key transaction on the first fork and the re-key transaction on the second fork are substantially simultaneous,
   wherein the public address is cryptographically tied to the possession token by hashing the public address as the input to the cryptographic hash function outputting the origin hash of the possession token, and
   wherein the finality requirement is a threshold number of data blocks in a blockchain data structure of the distributed ledger network within a longest chain of data blocks of the distributed ledger network.

16. A system comprising:
a network,
a custody server, comprising:
   a processor of the custody server,
   a memory of the custody server,
   a ledger key generation engine stored on the memory of the custody server comprising computer executable instructions that when executed on the processor of the custody server generates a public-private key pair comprising a private key and a public address,
   a possession key engine stored on the memory of the custody server comprising computer executable instructions that when executed on the processor of the custody server:
      generates a second public-private key pair referred to as a server overt key and a server covert key for exchange over the network for a client overt key to generate a shared secret; and
      receive as inputs the server overt key and the client overt key and generate the shared secret,
   a private key encryption module comprising computer executable instructions that when executed on the processor of the custody server encrypts the private key with the shared secret,
   a set of computer executable instructions that when executed on the processor of the custody server:
      transmit the public address over an encrypted communication channel; and
      verify a ledger transaction on a distributed ledger network to transfer a ledger token to a public key as the public address meets a finality requirement, and
a first computing device comprising:
   a processor of the first computing device,
   a memory of the first computing device, and
   an electronic vault comprising one or more memory addresses and a token evolution engine comprising computer executable instructions that when executed on the processor of the first computing device evolves a possession token and generates a state indicator of the possession token, and
a treasury server comprising:
   a processor of the treasury server,
   a memory of the treasury server,
   a transfer engine comprising computer executable instructions that when executed on the processor of the treasury server determines if a user is a record owner of the possession token in an acceptance record,
   a set of computer executable instructions that when executed on the processor of the treasury server:
      issue the possession token over the network.

17. The system of claim 16, further comprising:
a computing node of a validation network comprising:
   a processor of the computing node of the validation network,
   a memory of the computing node of the validation network, and
   a ledger database of the validation network comprising a token ID, the public address, and the state indicator of the possession token associated with the ledger token.

18. The system of claim 17, further comprising:
a second computing device, comprising:
   a processor of the second computing device,
   a memory of the second computing device, and
   a set of computer executable instructions that when executed on the processor of the second computing device:
      generate a transaction instruction in a protocol of a distributed ledger network to effect the ledger transaction to transfer the ledger token to the public key as the public address; and
      submit the transaction instruction to a computing node of the distributed ledger network.

19. The system of claim 18, further comprising:
the computing node of the distributed ledger network further comprising:
   a processor of the computing node of the distributed ledger network,
   a memory of the computing node of the distributed ledger network,
   a ledger database of the distributed ledger network stored in a blockchain data structure and comprising the public address and the ledger token, and
   the first computing device further comprising a set of computer readable instructions that when executed on the processor of the first computing device:
      generate the second public-private key pair comprising the client overt key and a client covert key;
      utilize the client covert key solely on the first computing device to evolve a state of the possession token; and
      transmit the client overt key from the first computing device to a server.

20. The system of claim 19, wherein the treasury server further comprising:
   a validation engine comprising computer executable instructions that when executed on the processor of the treasury server at least one of: determines a last instance of the state indicator of the possession token was generated by the user, determines the possession token has an origin data that is valid, and determines that the private key is associated with the public address.

* * * * *